United States Patent
Funabiki et al.

(10) Patent No.: US 10,921,604 B2
(45) Date of Patent: Feb. 16, 2021

(54) VIDEO DISPLAY SYSTEM, VIDEO DISPLAY METHOD, NON-TRANSITORY STORAGE MEDIUM, AND MOVING VEHICLE THAT PROJECTS A VIRTUAL IMAGE ONTO A TARGET SPACE

(71) Applicants: PANASONIC INTELLECTUAL PROPERTY MANAGEMENT CO., LTD., Osaka (JP); HONDA MOTOR CO., LTD., Tokyo (JP)

(72) Inventors: Makoto Funabiki, Osaka (JP); Koji Taniguchi, Fukuoka (JP); Hiroaki Okayama, Nara (JP); Masafumi Higashiyama, Saitama (JP); Yosuke Shibazaki, Saitama (JP)

(73) Assignees: PANASONIC INTELLECTUAL PROPERTY MANAGEMENT CO., LTD., Osaka (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/447,365

(22) Filed: Jun. 20, 2019

(65) Prior Publication Data
US 2019/0391400 A1    Dec. 26, 2019

(30) Foreign Application Priority Data
Jun. 21, 2018    (JP) .................................. 2018-117663

(51) Int. Cl.
*G02B 27/01* (2006.01)
*G01C 21/36* (2006.01)
*B60K 35/00* (2006.01)

(52) U.S. Cl.
CPC ..... *G02B 27/0179* (2013.01); *G02B 27/0101* (2013.01); *B60K 35/00* (2013.01);
(Continued)

(58) Field of Classification Search
None
See application file for complete search history.

(56) References Cited

U.S. PATENT DOCUMENTS 9,995,932 B2 * 6/2018 Tai .................... G02B 27/0101
10,613,325 B2 * 4/2020 Matsuzaki ......... G02B 27/0149
(Continued)

FOREIGN PATENT DOCUMENTS

JP    2017-142491    8/2017

*Primary Examiner* — Jason A Pringle-Parker
(74) *Attorney, Agent, or Firm* — Greenblum & Bernstein, P.L.C.

(57) ABSTRACT

A video display system includes a display unit, a projection unit, and a display control unit. The display unit displays an image. The projection unit projects a virtual image onto a target space with outgoing light of the display unit. The display control unit shifts a projection position of the virtual image by changing at least one of a projection distance or an angle of depression. The projection distance is a distance from a viewpoint to the virtual image. The angle of depression is an angle from which the virtual image is viewed from the user's viewpoint. The display control unit changes the projection distance of the virtual image in accordance with a distance instruction and changes at least one of the projection distance or the angle of depression such that the virtual image is projected onto a displayable region of the target space.

19 Claims, 11 Drawing Sheets

(52) U.S. Cl.
CPC .. *B60K 2370/1529* (2019.05); *B60K 2370/52* (2019.05); *G01C 21/365* (2013.01); *G02B 2027/0141* (2013.01); *G02B 2027/0183* (2013.01); *G02B 2027/0185* (2013.01)

(56) References Cited

U.S. PATENT DOCUMENTS

| | | | |
|---|---|---|---|
| 2004/0219978 A1* | 11/2004 | Teramoto | A63F 13/10 463/32 |
| 2004/0219980 A1* | 11/2004 | Bassett | A63F 13/10 463/33 |
| 2007/0257914 A1* | 11/2007 | Komatsumoto | G06T 13/20 345/427 |
| 2012/0032874 A1* | 2/2012 | Mukawa | G02B 27/0172 345/8 |
| 2013/0208005 A1* | 8/2013 | Kasahara | G06T 19/006 345/633 |
| 2013/0222228 A1* | 8/2013 | Walker | H04N 9/3179 345/156 |
| 2014/0268353 A1* | 9/2014 | Fujimura | G02B 27/01 359/630 |
| 2015/0097866 A1* | 4/2015 | Mochizuki | G09G 5/38 345/633 |
| 2015/0321606 A1* | 11/2015 | Vartanian | B60R 1/00 348/148 |
| 2016/0140760 A1* | 5/2016 | Bowden | B60R 1/00 345/633 |
| 2016/0187651 A1* | 6/2016 | Border | G06F 3/012 345/8 |
| 2016/0266390 A1* | 9/2016 | Seo | G09G 3/001 |
| 2017/0131550 A1* | 5/2017 | Oh | G06T 11/60 |
| 2017/0169612 A1* | 6/2017 | Cashen | G06T 19/20 |
| 2017/0309049 A1* | 10/2017 | Law | G06T 15/04 |
| 2018/0259637 A1* | 9/2018 | Zeng | G01S 13/931 |
| 2018/0335634 A1* | 11/2018 | Oliveira | G02B 27/0179 |
| 2019/0011703 A1* | 1/2019 | Robaina | A61B 90/37 |
| 2019/0116344 A1* | 4/2019 | Nguyen | H04N 9/317 |

* cited by examiner

VIDEO DISPLAY SYSTEM, VIDEO DISPLAY METHOD, NON-TRANSITORY STORAGE MEDIUM, AND MOVING VEHICLE THAT PROJECTS A VIRTUAL IMAGE ONTO A TARGET SPACE

CROSS-REFERENCE TO RELATED APPLICATION

This application claims the benefit of foreign priority to Japanese Patent Application No. 2018-117663 filed on Jun. 21, 2018, which is assigned to the assignee of the present application.

TECHNICAL FIELD

The present disclosure generally relates to a video display system, a video display method, a non-transitory storage medium, and a moving vehicle including the video display system, and more particularly relates to a video display system, a video display method, a non-transitory storage medium, and a moving vehicle including the video display system, all of which are configured or designed to project a virtual image onto a target space.

BACKGROUND ART

An image display device has been known as a video display system for projecting a virtual image onto a target space. Such an image display device is disclosed, for example, in JP 2017-142491 A (hereinafter referred to as D1). This image display device is implemented as a head-up display (HUD) for vehicles such as automobiles. The HUD is built in the dashboard of a vehicle to project light to produce an image. The projected light is reflected from the windshield of the vehicle toward the vehicle driver who is the viewer of the image. This allows the driver to recognize the image such as a navigation image as a virtual image.

In this image display device, a vehicle velocity image indicating the velocity of the vehicle is displayed as a virtual image in a lower part of the display area. The vehicle velocity image is displayed in the lower part of the display area so as not to obstruct the driver's view of the real space in front of him or her. In general, the driver usually fixes his or her gaze on either a point at infinity or the foregoing vehicle traveling several ten meters ahead of his or her own vehicle. Thus, to reduce the magnitude of shifting the driver's gaze, the image display device sets the distance from the driver to the vehicle velocity image at 5 meters or more.

In the image display device of D1, however, the vehicle velocity image displayed in the lower part of the display area could look, depending on the degree of sway of the vehicle or the gradient of the road, as if the vehicle velocity image penetrated into the road (i.e., an object present in the target space).

SUMMARY

The present disclosure provides a video display system, a video display method, a non-transitory storage medium, and an moving vehicle, all of which are configured or designed to reduce the chances of a virtual image projected looking as if part or all of the virtual image penetrated into an object present in the target space.

A video display system according to an aspect of the present disclosure includes a display unit, a projection unit, and a display control unit. The display unit displays an image thereon. The projection unit projects a virtual image, corresponding to the image, onto a target space with outgoing light of the display unit. The display control unit is able to shift a projection position of the virtual image by changing at least one of a projection distance or an angle of depression. The projection distance is a distance from a viewpoint of a user, who is viewing the virtual image, to the virtual image projected onto the target space. The angle of depression is an angle from which the virtual image is viewed from the user's viewpoint. The display control unit changes the projection distance of the virtual image in accordance with a distance instruction and changes at least one of the projection distance or the angle of depression such that the virtual image is projected onto a displayable region. The displayable region is a region, excluding a restricted region, of the target space.

A moving vehicle according to another aspect of the present disclosure includes: the video display system described above; and a moving vehicle body in which the video display system is installed.

A video display method according to still another aspect of the present disclosure includes: projecting a virtual image onto a target space with outgoing light of a display unit; changing a projection distance of the virtual image in accordance with a distance instruction; and changing at least one of the projection distance or an angle of depression such that a virtual image is projected onto a displayable region. The projection distance is a distance from a viewpoint of a user, who is viewing the virtual image, to the virtual image. The angle of depression is an angle, from which the virtual image is viewed from the user's viewpoint. The displayable region is a region, excluding a restricted region, of the target space.

A non-transitory storage medium according to yet another aspect of the present disclosure stores a program that is designed to make a computer system execute the video display method described above.

DESCRIPTION OF EMBODIMENTS

Embodiment (1) Overview

Figure 1:
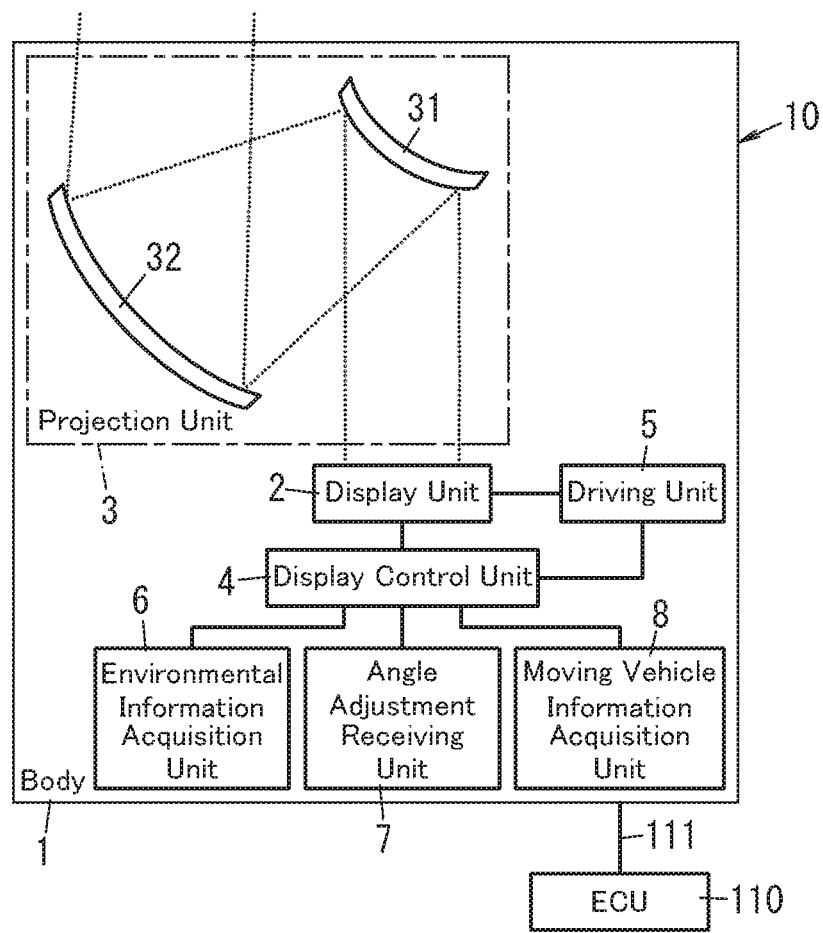
FIG. 1 is a block diagram illustrating a schematic configuration for a video display system according to an exemplary embodiment of the present disclosure.

A video display system 10 according to an exemplary embodiment includes a display unit 2, a projection unit 3, and a display control unit 4 as shown in FIG. 1.

The display unit 2 displays an image thereon.

Figure 2:
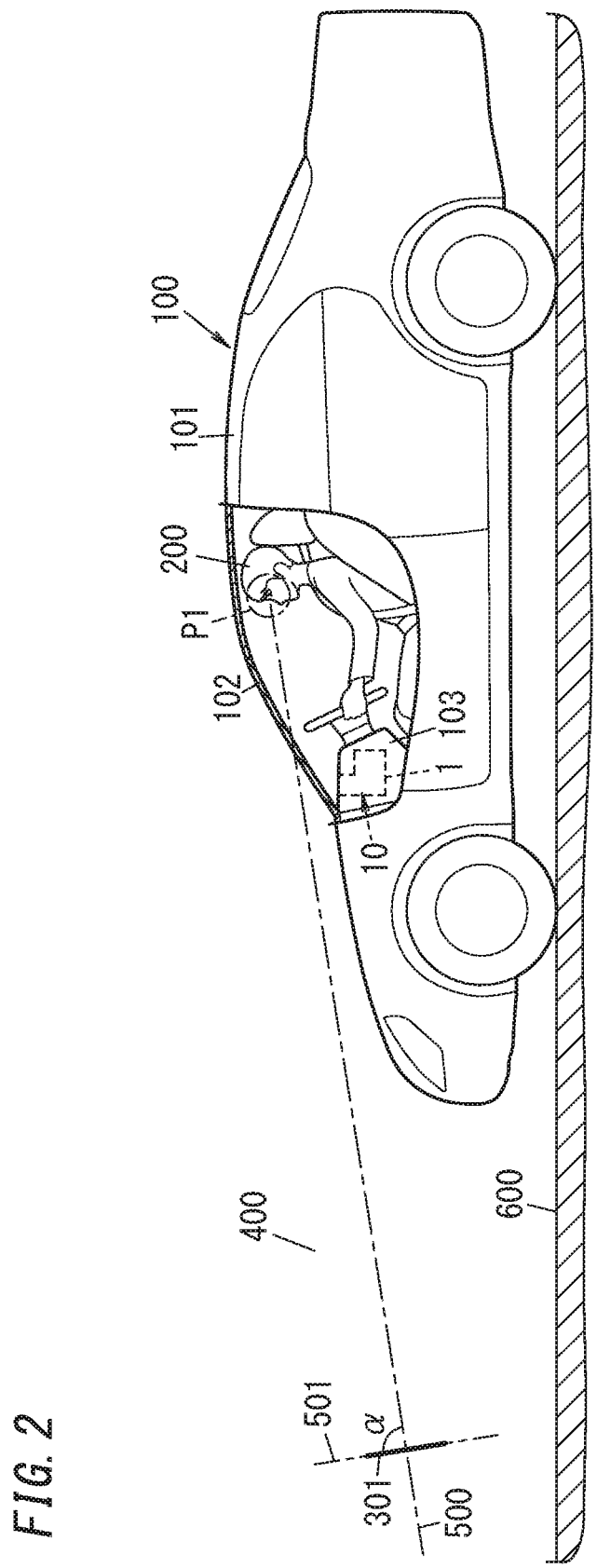
FIG. 2 schematically depicts a moving vehicle including the video display system.
Figure 3:
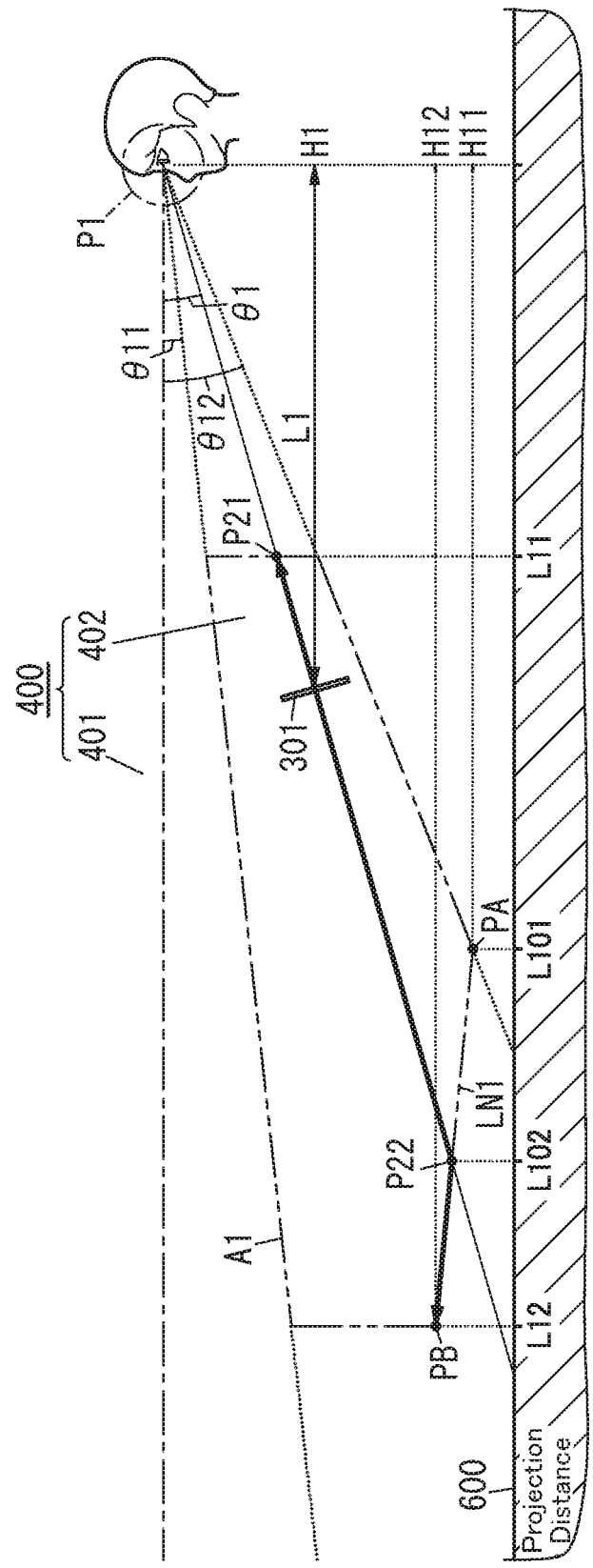
FIG. 3 illustrates one mode in which the video display system changes the projection distance of a virtual image.

The projection unit 3 projects a virtual image 301, corresponding to the image, onto a target space 400 with the outgoing light of the display unit 2 (see FIGS. 2 and 3).

The display control unit 4 is able to shift a projection position of the virtual image 301 by changing at least one of a projection distance L1 or an angle of depression θ1 (see FIG. 3). The projection distance L1 is a distance from a viewpoint P1 of a user 200, who is viewing the virtual image 301, to the virtual image 301 projected onto the target space 400. The angle of depression θ1 is an angle from which the virtual image 301 is viewed from the user's 200 viewpoint P1. The display control unit 4 changes the projection distance L1 of the virtual image 301 in accordance with a distance instruction and changes at least one of the projection distance L1 or the angle of depression θ1 such that the virtual image 301 is projected onto a displayable region 402. The displayable region 402 is a region, excluding a restricted region 401, of the target space 400.

Such a video display system 10 may be mounted, for example, in a moving vehicle body 101 of a moving vehicle 100 such as an automobile (see FIG. 2). The user 200 who is boarding the moving vehicle 100 (such as the driver of the moving vehicle 100) recognizes the virtual image 301 displayed by the video display system 10 as if the virtual image 301 were projected onto the target space 400 that is set in front of the moving vehicle 100. As used herein, the "virtual image" refers to an image formed, as if an object were actually present, on the user's 200 eyes by a reflected light beam, when the light beam emerging from the video display system 10 is reflected from a reflector such as the windshield 102 of the moving vehicle 100 to turn into the reflected light beam. In other words, the light beam projected by the video display system 10 onto the windshield 102 is reflected from the windshield 102 to form an image on the user's 200 eyes, thus making the user 200 recognize a virtual image that looks, to his or her eyes, as if the virtual image were actually projected at a predetermined projection distance. The windshield 102 has a light-transmitting property, which allows the user 200 to view the target space 400 in front of the moving vehicle 100 through the windshield 102. This allows the user 200 to view the virtual image 301 projected by the video display system 10 such that the virtual image 301 is superimposed on his or her view of the real space in front of the moving vehicle 100. Thus, this video display system 10 allows the user 200 to be presented as the virtual image 301 with, and visually recognize, various types of driver assistance information including vehicle velocity information and vehicle condition information. This allows the user 200 to visually acquire the driver assistance information just by shifting his or her gaze only slightly in the state where he or she is watching the real space in front of the windshield 102. Although the virtual image displayed by the video display system 10 is formed on the user's 200 eyes, the virtual image will be regarded in the following description as being "projected" at the predetermined projection distance by the video display system 10 for the sake of convenience.

As used herein, the "viewpoint P1" of the user 200 does not have to be a point in the real space but may also be a predetermined range in which the user's 200 eyes are supposed to be located (i.e., a so-called "eye box"). As long as the user's 200 eyes are located within this range, the user 200 is allowed to view the virtual image 301 with his or her eyes. Also, as used herein, the "projection distance L1" refers to the distance from the user's 200 viewpoint P1 to a representative point of the virtual image 301. The representative point of the virtual image 301 is a point of the virtual image 301, to which the user 200 fixes his or her gaze, and may be the center of gravity of the virtual image 301, for example. As used herein, the "angle of depression θ1" refers to the angle defined by the line of the sight direction connecting the user's 200 viewpoint P1 to the representative point of the virtual image 301 with respect to a horizontal plane in a situation where the user 200 looks down on the virtual image 301. The "distance instruction" refers herein to either an instruction generated inside of the display control unit 4 or an instruction externally given to the display control unit 4 to specify the projection distance L1 of the virtual image 301. The "restricted region 401" refers herein to a part of the target space 400 to which the virtual image 301 is projectable, and is a region where the projection of the virtual image 301 is restricted. Examples of the restricted region 401 include regions where the road surface 600, another vehicle 700 traveling ahead of the user's 200 (see FIG. 4), buildings, structures, humans, and other objects are present. The displayable region 402 is a region, excluding the restricted region 401, of the target space 400.

According to this embodiment, when changing the projection distance L1 of the virtual image 301 in accordance with a distance instruction, the display control unit 4 changes at least one of the projection distance L1 or the angle of depression θ1 such that the virtual image 301 is displayed in the displayable region 402. This reduces the chances of the virtual image 301 being projected onto the restricted region 401. Therefore, specifying such a region where an object such as the road is present as the restricted region 401 reduces the chances of the virtual image 301 projected looking as if part or all of the virtual image 301 penetrated into that object. This improves the viewability of the virtual image 301 displayed by the video display system 10.

(2) Details

Next, a video display system 10 according to an exemplary embodiment and a moving vehicle 100 including the video display system 10 will be described in detail with reference to the accompanying drawings.

(2.1) Configuration

A video display system 10 according to an exemplary embodiment may be implemented as a head-up display (HUD) to be mounted in a moving vehicle 100 such as an automobile as shown in FIGS. 1 and 2. That is to say, the moving vehicle 100 includes the video display system 10 and a moving vehicle body 101 in which the video display system 10 is installed.

This video display system 10 is installed in the vehicle cabin of the moving vehicle 100 so as to project an image onto the windshield 102 (reflector) of the moving vehicle 100 from under the windshield 102. In the example illustrated in FIG. 2, the video display system 10 is arranged in a dashboard 103 under the windshield 102. When an image is projected onto the windshield 102 from the video display system 10, the user 200 recognizes the image projected onto the windshield 102 as a virtual image 301 displayed in the target space 400 set in front of (and outside of) the moving vehicle 100.

Figure 4:
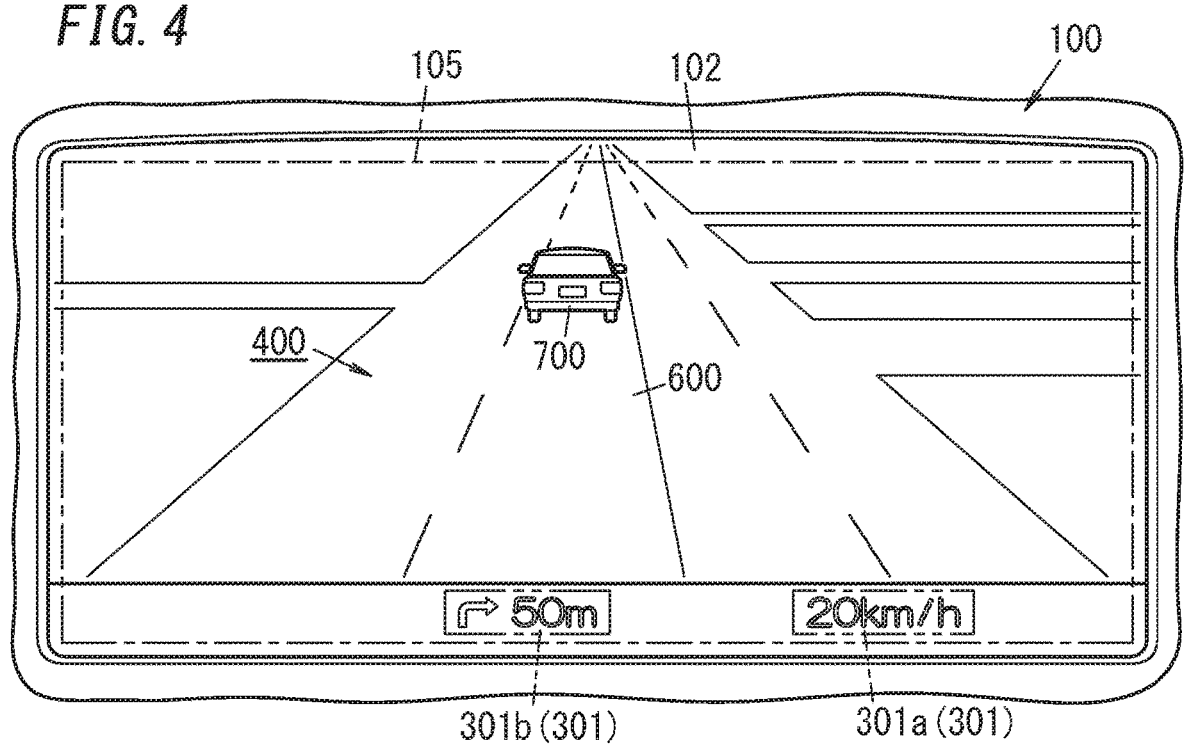
FIG. 4 conceptually illustrates the user's field of view when the video display system is used.

As used herein, the "virtual image" refers to an image formed, as if an object were actually present, on the user's 200 eyes by a reflected light beam, when the light beam emerging from the video display system 10 is reflected from a reflector such as the windshield 102 to turn into the reflected light beam. This allows the user 200 who is boarding the moving vehicle 100 to view the virtual image 301 projected by the video display system 10 such that the virtual image 301 is superimposed on his or her view of the real space in front of the moving vehicle 100 as shown in FIG. 4. Thus, this video display system 10 allows the user 200 to be presented, as the virtual image 301 superimposed on his or her view of the real space in front of the moving vehicle 100 with, and visually recognize, various types of driver assistance information.

The virtual image 301 projected onto the target space 400 by the video display system 10 is displayed on a virtual plane 501. The virtual plane 501 is a plane, of which the tilt angle $\alpha$ with respect to the optical axis 500 of the video display system 10 is larger than a predetermined value $\gamma$ (i.e., a virtual plane that satisfies $\alpha > \gamma$). As used herein, the "optical axis 500" refers to a direction in which the light is incident on the user's 200 eyes (i.e., his or her viewpoint) via the projection unit 3. More specifically, the optical axis 500 is a direction in which the light that has emerged from the projection unit 3 and has been reflected from the windshield 102 is incident on the user's 200 eyes (i.e., his or her viewpoint P1), and extends along an optical path that connects the user's 200 eyes (viewpoint P1) and the position of the virtual image 301 together. The optical axis 500 extends, in the target space 400 in front of the moving vehicle 100, along the road surface 600 in front of the moving vehicle 100. In this example, the predetermined value $\gamma$ may be 45 degrees, for example, and the tilt angle $\alpha$ may be 90 degrees, for example. The virtual plane 501 on which the virtual image 301 is formed is substantially perpendicular to the road surface 600. For example, if the road surface 600 is a horizontal plane, the virtual image 301 is displayed on a vertical plane. Therefore, the virtual image 301 formed on the virtual plane 501 is recognized by the user as being located on a plane that is generally perpendicular to the road surface 600.

The virtual image 301 has its projection distance L1 varied according to the velocity of the moving vehicle 100, for example. The display control unit 4 changes, in accordance with a distance instruction, the projection distance L1 of the virtual image 301. The distance instruction may be based on moving vehicle information about the moving vehicle 100, for example. The moving vehicle information may be, for example, velocity information indicating the velocity of the moving vehicle 100. The display control unit 4 extends the projection distance L1 of the virtual image 301 as the moving vehicle 100 increases its velocity. In this case, the display control unit 4 may generate the distance instruction based on the velocity information. Alternatively, a distance instruction externally generated may be input to the display control unit 4.

The virtual image 301 includes a first virtual image 301*a* and a second virtual image 301*b* to be displayed only when an event occurs. As used herein, the "event" refers to an event that triggers display of the second virtual image 301*b*. The event includes a situation that requires the navigation system to provide some kind of notification information for the user 200 and/or a situation that requires providing some kind of alert information about some abnormal condition of the moving vehicle 100 or an alarm for the user 200.

The first virtual image 301*a* is a virtual image providing, for example, traveling information about the traveling state of the moving vehicle 100 and/or environmental information about the environment surrounding the moving vehicle 100. The first virtual image 301*a* is displayed in a lower part of the windshield 102. The first virtual image 301*a* is always displayed while the moving vehicle 100 is traveling, as a matter of principle. If necessary, however, the display of the first virtual image 301*a* may be suspended temporarily. Examples of the traveling information include at least one of velocity information indicating the velocity (vehicle velocity) of the moving vehicle 100, distance information, or time information. Examples of the distance information include at least one of the total distance traveled by the moving vehicle 100, the distance traveled from a predetermined origin, or the remaining distance to travel to arrive at the destination entered into the navigation system. Examples of the time information include at least one of the current time or the estimated time of arrival at the destination. Examples of the environmental information include at least one of the environmental temperature, the wind velocity, the wind direction, or the weather. In the example illustrated in FIG. 4, the first virtual image 301*a* is a character string (e.g., "20 km/h") indicating the velocity of the moving vehicle 100. However, the first virtual image 301*a* does not have to indicate the velocity but may be changed as appropriate.

The second virtual image 301*b* is displayed to present at least one of a first type of notification information provided by the navigation system at a predetermined timing or a second type of notification information about some abnormal condition of the moving vehicle 100 or an alarm. The second virtual image 301*b* may be displayed on an upper part of the windshield 102, for example. Examples of the first type of notification information include information indicating the distance and the traveling direction to a point to make a right or left turn and information about road signs (e.g., information about the velocity limit indicated by one of the road signs) set on the road along which the moving vehicle 100 is now traveling. Examples of the second type of notification information include notification information about any abnormality that has occurred to the moving vehicle 100 or notification information provided as an alarm to some dangerous situation requiring caution for the user 200 while driving the moving vehicle 100. Examples of the abnormality of the moving vehicle 100 include a malfunction of the engine or battery, failure to close a door, and failure to wear the seatbelt. Examples of such alarms to dangerous situations that require caution for the user 200 while driving the moving vehicle 100 include an alarm to the lane deviation of the moving vehicle 100, an alarm to the approach to some obstacle, an alarm to the excessive proximity of the foregoing or following vehicle, and an alarm to the moving vehicle's 100 excess of the velocity limit.

In this case, the second virtual image 301b shown as an example in FIG. 4 is a piece of notification information (the first type of notification information) provided by the navigation system when the moving vehicle 100 is approaching a point to change the traveling direction. The second virtual image 301b is made up of a sign (such as an arrow) indicating the turning direction and a character string indicating the distance to the point to make the turn (e.g., "50 m"). Note that the second virtual image 301b does not have to be the notification information provided by the navigation system at a predetermined timing but may be changed appropriately.

The first virtual image 301a and the second virtual image 301b may present these pieces of information in the forms of characters, numerals, signs and meter icons (e.g., a tachometer icon or a fuel gauge icon), for example.

As can be seen, the video display system 10 according to this embodiment is able to display, on the virtual plane 501, the virtual image 301 including at least one of the first virtual image 301a or the second virtual image 301b. The video display system 10 projects the virtual image 301 such that the virtual image 301 is displayed several to several ten meters ahead of the moving vehicle 100. In addition, the video display system 10 changes the projection distance L1 of the virtual image 301 such that the higher the velocity of the moving vehicle 100 is, the more distant from the moving vehicle 100 the virtual image 301 is viewable. Next, the respective constituent elements of the video display system 10 will be described in detail one by one.

The video display system 10 includes a body 1, the display unit 2, the projection unit 3, the display control unit 4, a driving unit 5, an environmental information acquisition unit 6, an angle adjustment receiving unit 7, and a moving vehicle information acquisition unit 8 as shown in FIG. 1.

The body 1 may be implemented as a box made of a synthetic resin, for example. The body 1 houses the display unit 2, the projection unit 3, the display control unit 4, the driving unit 5, the environmental information acquisition unit 6, the angle adjustment receiving unit 7, and the moving vehicle information acquisition unit 8. The body 1 may be fixed, for example, in the dashboard 103 of the moving vehicle 100. The body 1 does not have to be implemented as a box but may also be configured as a frame or a plate member as long as the body 1 is able to house the display unit 2, the projection unit 3, the display control unit 4, the driving unit 5, the environmental information acquisition unit 6, the angle adjustment receiving unit 7, and the moving vehicle information acquisition unit 8 therein and is attachable to the moving vehicle body 101. The shape of the body 1 may be changed appropriately.

The display unit 2 includes a display device such as a liquid crystal display. The liquid crystal display includes a liquid crystal panel and a backlight. The display unit 2 displays an image thereon based on image data provided by the display control unit 4.

The projection unit 3 projects, with the light emerging from the display screen of the display unit 2 (hereinafter referred to as "outgoing light of the display unit 2"), a virtual image 301, corresponding to the image displayed on the display unit 2, onto the target space 400. The video display system 10 according to this embodiment is a head-up display mounted in the moving vehicle 100 such as an automobile, and the projection unit 3 projects the image onto the windshield 102 (see FIG. 2) of the moving vehicle 100. The projected image is formed in the projection area 105 (see FIG. 4) of the windshield 102.

The projection unit 3 includes a first mirror 31 and a second mirror 32 as shown in FIG. 1. The first mirror 31 and the second mirror 32 are arranged in this order along an optical path leading from the display unit 2 to the viewpoint P1 of the user 200. More specifically, the first mirror 31 is arranged over the display screen of the display unit 2 such that the outgoing light of the display unit 2 is incident on the first mirror 31. The first mirror 31 reflects the outgoing light of the display unit 2 toward the second mirror 32. The second mirror 32 is positioned to receive the outgoing light, reflected from the first mirror 31, of the display unit 2 (e.g., in front of and under the first mirror 31). The second mirror 32 reflects the outgoing light, already reflected from the first mirror 31, of the display unit 2 upward (i.e., toward the windshield 102). The first mirror 31 may be a convex mirror, and the second mirror 32 may be a concave mirror, for example. However, this is only an example and should not be construed as limiting. The first mirror 31 does not have to be a convex mirror but may also be a plane mirror or even a concave mirror. Likewise, the second mirror 32 does not have to be a concave mirror but may also be a plane mirror or even a convex mirror. In this embodiment, the light projected from the projection unit 3 is reflected by the windshield 102. Alternatively, the light projected from the projection unit 3 may be reflected from a reflective member arranged in an upper part of the dashboard 103 and then allowed to be incident on the user's 200 eyes.

The driving unit 5 shifts the display unit 2 so as to change the projection distance L1 of the virtual image 301 in accordance with a control instruction from the display control unit 4. The projection distance L1 varies according to the length of the optical path of the light that has emerged from the display unit 2 to enter the user's 200 eyes (viewpoint P1) via the projection unit 3. That is to say, the longer the optical path length is, the longer the projection distance L1 is. The driving unit 5 shifts the display unit 2 such that the length of the optical path of the light that has emerged from the display unit 2 to enter the user's 200 eyes (viewpoint P1) via the projection unit 3 becomes a distance specified by a control instruction given by the display control unit 4. The driving unit 5 may include, for example, a voice coil motor, to which the display unit 2 is fixed. Changing the amount and direction of the current supplied to the voice coil causes the voice coil to reciprocate, thus allowing the display unit 2 to be shifted in the direction in which light emerges from the display unit 2. As can be seen, the driving unit 5 shifting the display unit 2 changes the length of the optical path of the light that has emerged from the display unit 2 to enter the user's 200 eyes (viewpoint) via the projection unit 3, and thereby changes the projection distance L1 of the virtual image 301. Note that this configuration of the driving unit 5 is only an example and may be changed as appropriate.

The environmental information acquisition unit 6 acquires environmental information about the environment surrounding the moving vehicle 100 either at regular intervals or at irregular intervals. In this embodiment, the environmental information acquisition unit 6 acquires, as environmental information about the surrounding environment, information about the brightness of the environment surrounding the video display system 10. The body 1 includes a brightness sensor for detecting the brightness of the environment surrounding the body 1 (video display system 10). The environmental information acquisition unit 6 acquires information about the brightness of the environment surrounding the body 1 based on the value measured by the brightness sensor. Such a sensor for acquiring information about the brightness of the surrounding environment may be an image sensor such as a complementary metal oxide semiconductor (CMOS) image sensor for shooting the environment surrounding the moving vehicle 100. The environmental information acquisition unit 6 is able to acquire information about the brightness of the surrounding environment from pixel values of respective pixels based on the image data acquired from the image sensor.

Note that the environmental information does not have to be information about the brightness of the environment surrounding the video display system 10. Alternatively, the environmental information may also be information about at least one of the brightness of the environment surrounding the video display system 10 and information about swaying motion of the moving vehicle 100 with the video display system 10 (sway of the moving vehicle body 101), temperature, or humidity.

The angle adjustment receiving unit 7 receives setting information for setting the angle of depression $\theta 1$ for the virtual image 301 displayed in a lower part of the user's 200 frontal field of view when the user 200 views the virtual image 301 (more specifically, the range of the angles of depression $\theta 1$). The driver's seat of the moving vehicle 100 is equipped with an operating unit for setting the range of the angles of depression $\theta 1$. The angle adjustment receiving unit 7 receives the setting information that the user 200 has entered with the operating unit. The driver's seat of the moving vehicle 100 is equipped with, as the operating unit, a first button for changing the range of the angles of depression $\theta 1$ upward and a second button for changing the range of the angles of depression $\theta 1$ downward. The angle adjustment receiving unit 7 receives the setting information from the first button and the second button. When the user 200 operates the operating unit to adjust the range of the angles of depression $\theta 1$, the angle adjustment receiving unit 7 receives the setting information from the operating unit and outputs the setting information to the display control unit 4.

The moving vehicle information acquisition unit 8 acquires moving vehicle information about the traveling state of the moving vehicle 100 either at regular intervals or at irregular intervals from an electronic control unit (ECU) 110 over a controller area network (CAN) 111, for example. The moving vehicle information includes at least one of velocity information about the velocity of the moving vehicle 100, sway information about the sway of the moving vehicle 100 measured by an acceleration sensor provided for the moving vehicle 100, notification information provided by the navigation system, or various kinds of alarms (to some abnormality of the moving vehicle 100, approach to an obstacle, lane deviation, and exceeding the velocity limit). Note that the ECU 110 controls a drive system, a steering system, and other systems of the moving vehicle 100 in accordance with the user's 200 command accepted by a human interface. Alternatively, the ECU 110 may also control the drive system, the steering system, and other systems of the moving vehicle 100 in accordance with a control instruction given by an advanced driver assistance system (ADAS).

The display control unit 4 controls the content displayed on the display unit 2. The display control unit 4 may be implemented as a microcomputer including a processor and a memory. That is to say, the display control unit 4 is implemented as a computer system including a processor and a memory. In other words, the computer system performs the function of the display control unit 4 by making the processor execute a predetermined program. The program may be stored in advance in either the memory or may also be downloaded via a telecommunications line such as the Internet or distributed after having been stored on a non-transitory storage medium such as a memory card.

The display control unit 4 generates image data to display the virtual image 301 and outputs the image data thus generated to the display unit 2, thus displaying an image corresponding to the virtual image 301 on the display unit 2.

The display control unit 4 also has the function of changing the projection distance L1 of the virtual image 301 by outputting a control instruction to the driving unit 5 to have the display unit 2 shifted by the driving unit 5 in the direction in which light emerges from the display unit 2.

The display control unit 4 further has the function of changing the angle of depression $\theta 1$ range in which the virtual image 301 is displayed by shifting, in accordance with the setting information provided by the angle adjustment receiving unit 7, the location on the display screen of the display unit 2, where the video to form the virtual image 301 is displayed. In the example illustrated in FIG. 3, the angles of depression $\theta 1$ that allow the virtual image 301 to be projected have a minimum value $\theta 11$ and a maximum value $\theta 12$. That is to say, the virtual image 301 is projected in the angle of depression $\theta 1$ range from $\theta 11$ to $\theta 12$. Note that the display control unit 4 varies, according to the velocity of the moving vehicle 100, the projection distance L1 of the virtual image 301 within the range from L11 to L12 (e.g., the range from 3 meters to 20 meters). The display control unit 4 also sets a lowest display level for the level of the virtual image 301 as measured from the road surface 600 to reduce the chances of the virtual image 301 displayed looking as if part or all of the virtual image 301 penetrated into the road surface 600 due to the sway of the moving vehicle 100, for example.

Therefore, the display control unit 4 sets, as the displayable region 402 where the virtual image 301 is displayable, a region where the angle of depression $\theta 1$ falls within the range from $\theta 11$ to $\theta 12$, the projection distance L1 falls within the range from L11 to L12, and the level as measured from the road surface 600 becomes equal to or higher than the lowest display level. FIG. 3 illustrates the target space 400 as viewed in the rightward/leftward direction that is perpendicular to both the traveling direction of the moving vehicle 100 and the upward/downward direction. In the example illustrated in FIG. 3, the range surrounded with the two-dot chain A1 is the displayable range 402 and the region, outside of the displayable region 402, of the target space 400 is the restricted region 401.

In this case, the variation, caused by the sway of the moving vehicle 100, in the projection position of the virtual image 301 becomes more and more significant, the farther away from the moving vehicle 100 the virtual image 301 is projected (i.e., the longer the projection distance L1 is). Thus, the display control unit 4 raises the lowest display level of the virtual image 301 as the projection distance L1 is extended. In the example illustrated in FIG. 3, when the angle of depression $\theta 1$ is the maximum value $\theta 12$ and the projection distance L1 is L101, the lowest display level becomes the smallest value H11. Once the projection distance L1 exceeds L101, as the projection distance L1 becomes longer, the lowest display level rises gradually. When the projection distance L1 reaches the maximum value L12, the lowest display level becomes H12. That is to say, the line segment LN1 that connects together a point PA where the projection distance L1 is L101 and the lowest display level is H11 and a point PB where the projection distance L1 is L12 and the lowest display level is H12 indicates the lowest display level in the range where the projection distance L1 falls within the range from L101 to L12.

In this case, the display control unit 4 determines the lowest display level of the virtual image 301 when the projection distance L1 falls within the range from L101 to L12 with the variation in the projection position of the virtual image 301 due to the sway of the moving vehicle 100 taken into account. For example, the display control unit 4 determines, in accordance with the sway information acquired by the moving vehicle information acquisition unit 8 and based on the sway angle of the moving vehicle 100 and the angle of depression $\theta 1$, the lowest display level on an angle of depression $\theta 1$ basis, thus determining the projection position of the virtual image 301. Note that the display control unit 4 may determine the projection position of the virtual image 301 based on at least one of the sway angle of the moving vehicle 100 or the angle of depression $\theta 1$. Since the distance to an object such as the road surface 600 may be obtained based on at least one of the sway angle or the angle of depression $\theta 1$, this allows the projection position of the virtual image 301 to be determined such that the virtual image 301 projected will not look as if the virtual image 301 penetrated into the object such as the road surface 600.

(2.2) Operation

Next, it will be described with reference to FIG. 3 and FIGS. 5-7 how the video display system 10 according to this embodiment operates.

Figure 5:
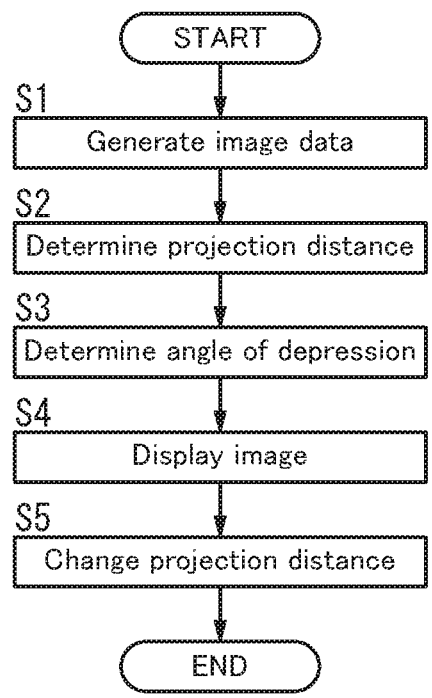
FIG. 5 is a flowchart showing how the video display system operates.

In the following description, it will be described with reference to FIG. 5 how the video display system 10 operates when projecting, as the virtual image 301, the first virtual image 301a indicating the velocity of the moving vehicle 100. When projecting the second virtual image 301b, the video display system 10 operates in the same way as when projecting the first virtual image 301a, and description thereof will be omitted herein. Note that when a projection operation commonly applicable to the first virtual image 301a and the second virtual image 301b is described, these two virtual images 301a and 301b will be collectively referred to as "virtual images 301."

First, the display control unit 4 retrieves velocity information from the moving vehicle information acquisition unit 8, and generates, based on the velocity information, image data representing the first virtual image 301a to indicate the velocity of the moving vehicle 100 (in Step S1).

The display control unit 4 determines the projection distance L1 of the first virtual image 301a based on the velocity information of the moving vehicle 100 (in Step S2). Generally speaking, in a situation where the user 200 who is driving the moving vehicle 100 is looking forward, the higher the velocity of the moving vehicle 100 is, the more distant the user 200 tends to fix his or her gaze. Therefore, to reduce the magnitude of shift of his or her gaze between the situation where he or she is looking at the real space in front of the moving vehicle 100 and the situation where he or she is viewing the first virtual image 301a, the display control unit 4 extends the projection distance L1 of the first virtual image 301a as the velocity of the moving vehicle 100 increases. That is to say, in accordance with the velocity information retrieved from the moving vehicle information acquisition unit 8, the display control unit 4 determines the projection distance L1 of the first virtual image 301a within a predetermined range (e.g., within the range from 3 m to 20 m).

In this processing step, the display control unit 4 sets, in accordance with the setting information provided by the angle adjustment receiving unit 7, the lower limit value of the angle of depression $\theta 1$ at $\theta 11$ and the upper limit value thereof at $\theta 12$. For the display control unit 4, the minimum value L11 and maximum value L12 of the projection distance L1 of the virtual image 301 have been set in advance and the lowest display level corresponding to the projection distance L1 has also been set in advance. Thus, the display control unit 4 sets, as the displayable region 402, a region where the angle of depression $\theta 1$ falls within the range from $\theta 11$ to $\theta 12$, the projection distance L1 falls within the range from L11 to L12, and the display level as measured from the road surface 600 becomes equal to or higher than the lowest display level.

Then, the display control unit 4 determines, based on the projection distance L1 determined in Step S2, the angle of depression $\theta 1$ of the virtual image 301 such that the virtual image 301 will be projected onto the displayable region 402 (in Step S3).

On determining the projection distance L1 and angle of depression $\theta 1$ of the virtual image 301, the display control unit 4 generates image data of an image corresponding to the virtual image 301 and outputs the image data to the display unit 2 to make the display unit 2 display the image corresponding to the virtual image 301 (in Step S4).

The display control unit 4 outputs, according to the projection distance L1 of the virtual image 301, a control instruction to the driving unit 5 to make the driving unit 5 shift the display unit 2, thereby projecting the virtual image 301 at the projection distance L1 that has been determined in Step S2 (in Step S5). By performing this series of processing steps S1-S5 repeatedly, the display control unit 4 projects the virtual image 301 onto the target space 400.

As can be seen, when changing the projection distance L1 of the virtual image 301 in accordance with the velocity information of the moving vehicle 100, the display control unit 4 projects the virtual image 301 at the projection distance L1 and angle of depression $\theta 1$ that have been determined in Steps S2 and S3, and therefore, is able to project the virtual image 301 within the displayable region 402. This reduces the chances of part or all of the virtual image 301 being projected within the restricted region 401. That is to say, this reduces the chances of the virtual image 301 projected looking as if part or all of the virtual image 301 penetrated into an object such as the road surface 600 present in the target space 400.

In the memory of the display control unit 4, stored are angle of depression $\theta 1$ settings for the respective projection distances L1. In FIG. 3, shown is a solid-line graph indicating the angle of depression $\theta 1$ settings for the respective projection distances L1. In the example illustrated in FIG. 3, as the projection distance L1 changes from L11 into L12, the angle of depression $\theta 1$ changes along the line segment connecting together points P21 and P22 and the line segment connecting together the point P22 and another point PB. Specifically, while the projection distance L1 changes from L11 into L102, the angle of depression $\theta 1$ is constant. On the other hand, while the projection distance L1 extends from L102 to L12, the angle of depression $\theta 1$ decreases gradually. Once the display control unit 4 has determined the projection distance L1 based on the velocity information of the moving vehicle 100, the display control unit 4 determines the angle of depression $\theta 1$ next based on the projection distance L1 and one of the settings stored in the memory. Then, the display control unit 4 changes the projection distance L1 and the angle of depression θ1 such that the virtual image 301 is displayed within the displayable region 402. In the example illustrated in FIG. 3, the display control unit 4 changes the projection position of the virtual image 301 such that as the projection distance L1 changes, the position in the height direction of the virtual image 301 shifts nonlinearly.

Optionally, the display control unit 4 may determine the angle of depression θ1 settings for respective projection distances L1 such that the line segment connecting the points P21 and P22 and the line segment connecting the points P22 and PB are connected together via a smooth curve. This allows the angle of depression θ1 of the first virtual image 301a to change smoothly while changing the projection distance L1 of the first virtual image 301a, thus allowing the projection position to change smoothly and making the shift of the projection position of the first virtual image 301a less noticeable.

Figure 6:
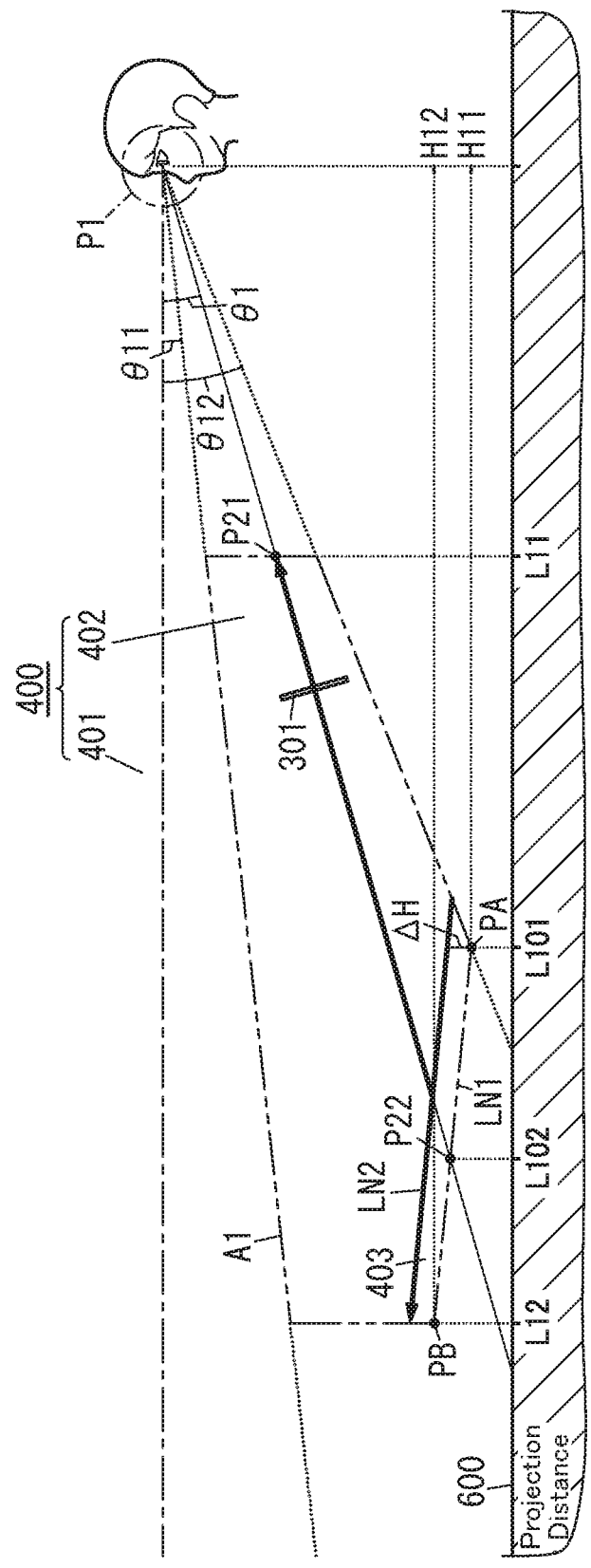
FIG. 6 illustrates another mode in which the video display system changes the projection distance of a virtual image.

In this embodiment, the display control unit 4 sets the minimum value of the display level of the virtual image 301 at the lowest display level. However, this is only an example and should not be construed as limiting. Alternatively, the minimum value of the display level of the virtual image 301 may also be set at the sum of the lowest display level and a predetermined quantity ΔH. In FIG. 6, the line segment LN2 is obtained by upwardly shifting, by the predetermined quantity ΔH, a line segment LN1 indicating the lowest display level when the projection distance L1 falls within the range from L101 to L12. The display control unit 4 determines the projection distance L1 and the angle of depression θ1 such that a lower part, located under the line segment LN2, of the displayable region 402 is defined as a non-display region 403 and that the virtual image 301 is displayed in an upper part, located over the non-display region 403, of the displayable region 402.

As can be seen, the display control unit 4 sets the minimum value of the display level of the virtual image 301 at a level higher by the predetermined quantity ΔH than the lowest display level. This further reduces, even when the projection position of the virtual image 301 has varied due to sway of the moving vehicle 100, for example, the chances of the virtual image 301 projected looking as if the virtual image 301 penetrated into the road surface 600. In this case, the display control unit 4 may determine the predetermined quantity ΔH that sets the non-display region 403, with at least one of information about the sway of the moving vehicle 100 or the tilt angle, acquired by the moving vehicle information acquisition unit 8, of the road surface 600 taken into account.

Figure 7:
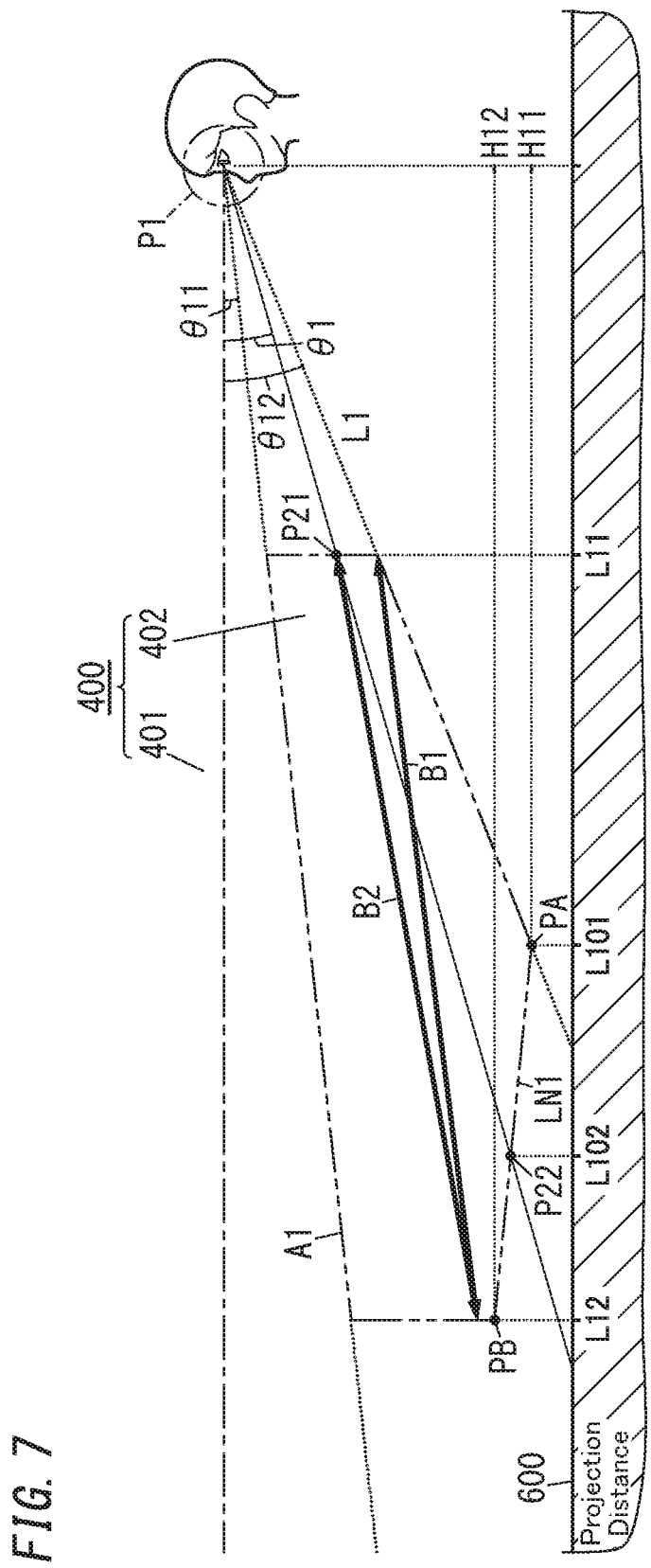
FIG. 7 illustrates still another mode in which the video display system changes the projection distance of a virtual image.

Alternatively, the display control unit 4 may also change the projection distance L1 and the angle of depression θ1 such that as the projection distance L1 of the first virtual image 301a is extended, the display level decreases at a constant gradient as shown in FIG. 7. In FIG. 7, the lines B1 and B2 are graphs each indicating the angle of depression θ1 settings for respective projection distances L1. The display control unit 4 changes the projection distance L1 and angle of depression θ1 of the first virtual image 301a such that the display level when the projection distance L1 is the longest distance L12 becomes equal to or higher than the lowest display level and that the display level changes at a constant gradient as the projection distance L1 changes. Even so, the display control unit 4 also determines the projection position of the first virtual image 301a by changing the projection distance L1 and the angle of depression θ1 such that as the projection distance L1 of the first virtual image 301a is extended, the angle of depression θ1 decreases. This allows the first virtual image 301a to be displayed within the displayable region 402. Thus, the video display system 10 according to this embodiment is able to reduce, even when projecting the first virtual image 301a at an even farther distance, the chances of the first virtual image 301a projected looking as if the first virtual image 301a penetrated into an object such as the road surface 600. In addition, the display control unit 4 changes the display level of the first virtual image 301a at a constant rate in the height direction as the projection distance L1 changes, thus reducing the chances of the user 200 finding the movement of the first virtual image 301a unnatural.

Furthermore, in the embodiment described above, the angle of depression θ1 settings are defined in advance for the respective projection distances L1 to allow the display control unit 4 to change the projection distance L1. However, this is only an example and should not be construed as limiting. Alternatively, the user 200 may set the angles of depression θ1 for the respective projection distances L1.

For example, when the user 200 sets the angle of depression θ1 using the operating unit with the virtual image 301 projected at the minimum projection distance L11, the display control unit 4 stores the angle of depression θ1 setting at the minimum projection distance L11 in the memory in accordance with the setting information provided by the angle adjustment receiving unit 7. The display control unit 4 sets the angle of depression θ1 at the projection distance L12 such that the display level at the maximum projection distance L12 becomes the lowest display level, and performs interpolation between the angle of depression θ1 setting at the projection distance L11 and the angle of depression θ1 setting at the projection distance L12, thereby determining the angles of depression θ1 for respective projection distances L1. In this manner, the display control unit 4 controls the angle of depression θ1 in accordance with the setting information received by the angle adjustment receiving unit 7, thus allowing the angle of depression θ1 to be set on a projection distance L1 basis according to the user's 200 preference.

Optionally, the display control unit 4 may determine the angle of depression θ1 settings for the respective projection distances L1 based on the angle of depression θ1 settings that have been selected by the user 200 for multiple projection distances L1. For example, when the angle adjustment receiving unit 7 receives setting information in response to the user's 200 command with the virtual image 301 projected at a particular projection distance L1, the display control unit 4 stores, in accordance with the setting information provided by the angle adjustment receiving unit 7, the angle of depression θ1 setting for this particular projection distance L1 in the memory. On the other hand, when the angle adjustment receiving unit 7 receives setting information in response to the user's 200 commands for multiple projection distances L1, the display control unit 4 stores angle of depression θ1 settings for the multiple projection distances L1 in the memory. Then, the display control unit 4 performs interpolation between the multiple projection distances L1 based on the angle of depression θ1 settings, stored in the memory, for the multiple projection distances L1, thereby defining correspondence between the projection distances L1 and the angles of depression θ1. That is to say, the display control unit 4 interpolates, in accordance with the setting information received by the angle adjustment receiving unit 7 for a projection distance L1 selected for setting, an angle of depression θ1 for a non-selected projection distance L1. This saves the user 200 the trouble of setting, because the user 200 only needs to set the angle of depression θ1 for the selected projection distance L1. In this case, the display control unit 4 may perform the interpolation either linearly or along a curve between the angle of depression θ1 settings for the multiple projection distances L1. This allows the angles of depression θ1 to be set on a projection distance L1 basis according to the user's preference.

Optionally, the video display system 10 according to this embodiment may display, on a virtual plane along the road surface 600, a virtual image, informing the user 200 that the traveling direction needs to be changed, in accordance with an instruction given by a navigation system. Such a virtual image will be hereinafter referred to as a "guidance image." Such a guidance image is displayed when the moving vehicle 100 is approaching a place where the traveling direction needs to be changed (e.g., a place where the moving vehicle 100 needs to make a right turn or a left turn). If another vehicle is present at the location where the guidance image is displayed, then the guidance image could look as if the guidance image penetrated into the other vehicle. On the other hand, if such a guidance image indicating a change of the traveling direction is displayed closer to the moving vehicle 100 than a foregoing vehicle in order to avoid the foregoing vehicle, then the user 200 could presume, by mistake, that the place to change the traveling direction should be just around the corner.

Therefore, when displaying the guidance image indicating a change of the traveling direction in accordance with the instruction given by the navigation system, the display control unit 4 displays, by default, the guidance image at a predetermined distance (of a few ten meters, for example) ahead of the moving vehicle 100. The display control unit 4 has acquired, from the moving vehicle information acquisition unit 8, information about the distance to the foregoing vehicle. When determining that no other vehicles should be present at the location where the guidance image is displayed, the display control unit 4 continues displaying the guidance image. On the other hand, when determining that another vehicle should be present at the location where the guidance image is displayed, the display control unit 4 projects the guidance image at a projection distance L1, determined by the velocity of the moving vehicle 100, at a timing when a predetermined amount of time (of a few seconds, for example) passes since the guidance image started to be displayed. Thus, even when there is another vehicle at the location where the guidance image is displayed, the guidance image is shifted forward by the predetermined distance. This reduces the chances of the user presuming, by mistake, that the place where he or she should change the traveling direction is closer to his or her moving vehicle 100 than the foregoing vehicle.

(3) Variations

The embodiment described above is only one of various embodiments of the present disclosure, and may be readily modified, changed, replaced, or combined with any other embodiments, depending on a design choice or any other factor, without departing from a true spirit and scope of the present disclosure. Also, the same function as that of the video display system 10 may be implemented as a video display method, a computer program, or a non-transitory storage medium that stores the computer program thereon, for example. A video display method according to an aspect includes: projecting a virtual image 301 onto a target space 400 with outgoing light of a display unit 2; changing a projection distance L1 of the virtual image 301 in accordance with a distance instruction; and changing at least one of the projection distance L1 or an angle of depression θ such that a virtual image 301 is projected onto a displayable region 402. The projection distance L1 is a distance from a viewpoint P1 of a user 200, who is viewing the virtual image 301, to the virtual image 301. The angle of depression θ is an angle, from which the virtual image 301 is viewed from the user's 200 viewpoint P1. The displayable region 402 is a region, excluding a restricted region 401, of the target space 400. A (computer) program according to another aspect is designed to make a computer system execute the video display method described above.

Next, variations of the embodiment described above will be enumerated one after another. Note that any of the variations to be described below may be combined as appropriate.

The agent that carries out the functions of the video display system 10 or the video display method according to the present disclosure includes a computer system. In that case, the computer system may include, as principal hardware components, a processor and a memory. The functions of the video display system 10 or the agent that carries out the video display method according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). As used herein, the "integrated circuit" such as an IC or an LSI is called by a different name depending on the degree of integration thereof. Examples of the integrated circuits include a system LSI, a very largescale integrated circuit (VLSI), and an ultra largescale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips without limitation. Those multiple chips may be integrated together in a single device or distributed in multiple devices without limitation.

Also, in the embodiment described above, the video display system 10 is implemented as a single device with various functions thereof implemented in a single housing (body 1). However, this is only an example and should not be construed as limiting. Alternatively, those functions of the video display system 10, namely, the functions of the display unit 2, the projection unit 3, and the display control unit 4, may be distributed in multiple different devices. Still alternatively, the function of at least one of the display unit 2, the projection unit 3, or the display control unit 4, may be distributed in two or more different devices. Optionally, the display control unit 4 may be implemented as a cloud computing system as well.

(3.1) First Variation

A video display system 10 according to a first variation shifts, when changing the projection distance L1 of the virtual image 301 in accordance with a distance instruction, the virtual image 301 parallel to the road surface 600, which is a major difference from the exemplary embodiment described above. Note that the video display system 10 according to the first variation has the same configuration as the video display system 10 according to the exemplary embodiment. Thus, each constituent element of this variation having the same function as a counterpart of the embodiment described above will be designated by the same reference numeral as that counterpart's, and a detailed description thereof will be omitted herein.

Figure 8:
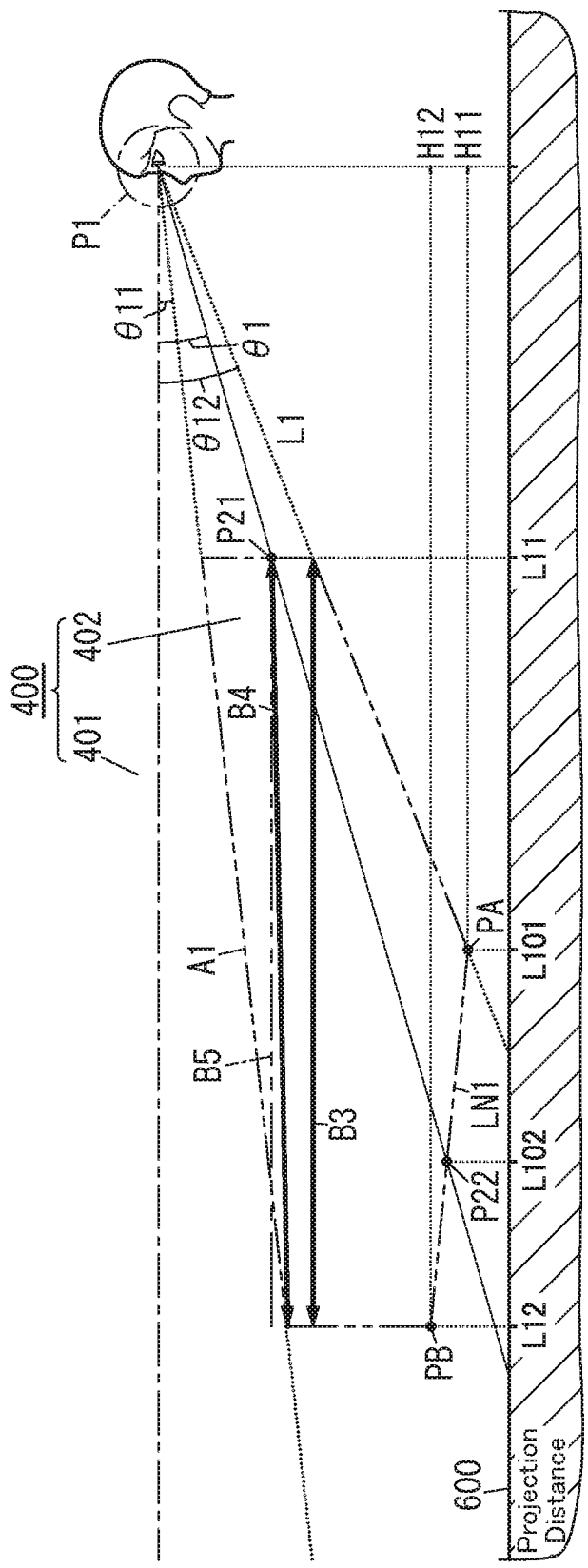
FIG. 8 illustrates one mode in which a video display system according to a first variation of the exemplary embodiment of the present disclosure changes the projection distance of a virtual image.

In the video display system 10 according to the first variation, the display control unit 4 shifts, when changing the projection distance L1 of the virtual image 301 in accordance with a distance instruction (velocity information of the moving vehicle 100), the virtual image 301 parallel to the road surface 600 as indicated by the line B3 in FIG. 8.

Specifically, the display control unit 4 changes both the projection distance L1 and the angle of depression $\theta 1$ so as to allow the virtual image 301 to shift parallel to the road surface 600 with the display level of the virtual image 301 kept at the same value. In that case, as the projection distance L1 is extended, the angle of depression $\theta 1$ decreases. The display level of the virtual image 301 is constant. Therefore, even when the projection distance L1 of the virtual image 301 is changed, the virtual image 301 will look, to the eyes of the user 200, being projected at the same level, thus reducing the chances of the user 200 finding the virtual image 301 unnatural. Note that if the display level of the virtual image 301 exceeds the upper limit of the displayable region 402 as the projection distance L1 is extended as indicated by the two-dot chain in FIG. 8, then the angle of depression $\theta 1$ may be decreased such that the virtual image 301 is displayed within the displayable region 402. That is to say, the display control unit 4 may change the projection distance L1 and the angle of depression $\theta 1$ such that as the projection distance L1 is extended, the display level decreases, as indicated by the line B4 in FIG. 8. This reduces the chances of the angle of depression $\theta 1$, from which the user 200 views the virtual image 301, becoming smaller than the lower limit value.

(3.2) Second Variation

In a video display system 10 according to a second variation, the display control unit 4 changes the angle of depression $\theta 1$ of the virtual image 301 in accordance with the environmental information, acquired by the environmental information acquisition unit 6, about the surrounding environment, which is a major difference from the exemplary embodiment described above. Note that the video display system 10 according to the second variation has the same configuration as the video display system 10 according to the exemplary embodiment. Thus, each constituent element of this variation having the same function as a counterpart of the embodiment described above will be designated by the same reference numeral as that counterpart's, and a detailed description thereof will be omitted herein.

Figure 9:
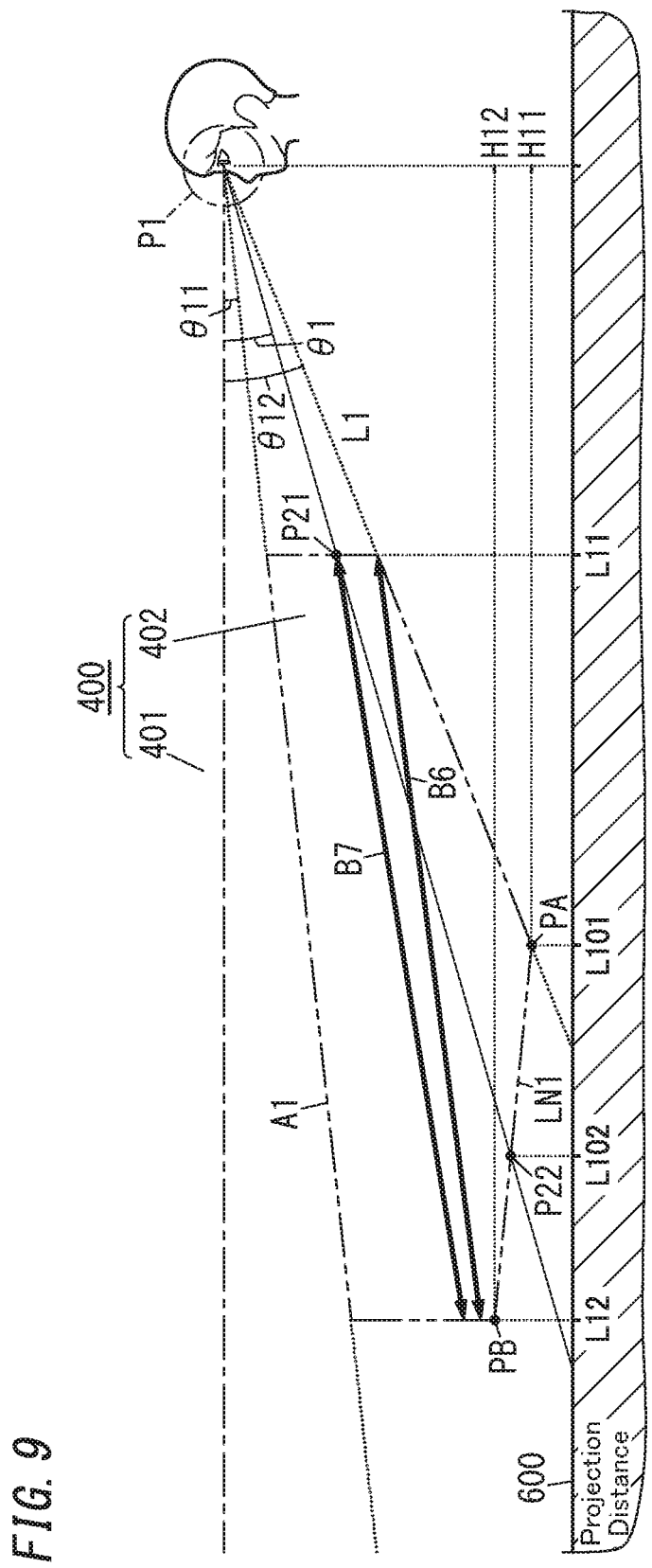
FIG. 9 illustrates one mode in which a video display system according to a second variation of the exemplary embodiment of the present disclosure changes the projection distance of a virtual image.

The display control unit 4 changes, in accordance with the brightness information acquired by the environmental information acquisition unit 6, the angle of depression $\theta 1$ of the virtual image 301. When determining, based on the brightness information, that the brightness of the surrounding environment is less than a predetermined reference value, the display control unit 4 changes the projection distance L1 and the angle of depression $\theta 1$ along the line B6 shown in FIG. 9. On the other hand, when determining, based on the brightness information, that the brightness of the surrounding environment is more than the predetermined reference value, the display control unit 4 changes the projection distance L1 and the angle of depression $\theta 1$ along the line B7 shown in FIG. 9.

The lines B6 and B7 are graphs each indicating a relationship between the projection distance L1 and angle of depression $\theta 1$ of the virtual image 301. The angle of depression $\theta 1$ indicated by the line B6 is greater than the one indicated by the line B7 (i.e., the display level according to the line B6 is lower than the one according to the line B7) when the projection distance L1 falls within the range from L11 to L12.

Therefore, when the brightness of the surrounding environment is less than the predetermined reference value, the virtual image 301 is projected at a lower level than when the brightness of the surrounding environment is more than the predetermined reference value. Generally speaking, when it is dark such as at night or in a bad weather, the user 200 needs to pay more attention to any person or obstacle present around the moving vehicle 100. According to this variation, the virtual image 301 is displayed at a lower level in such a situation, thus reducing the chances of the user 200 being distracted by the virtual image 301 and allowing him or her to pay more attention to the situation surrounding his or her moving vehicle 100.

(3.3) Third Variation

Figure 10A:
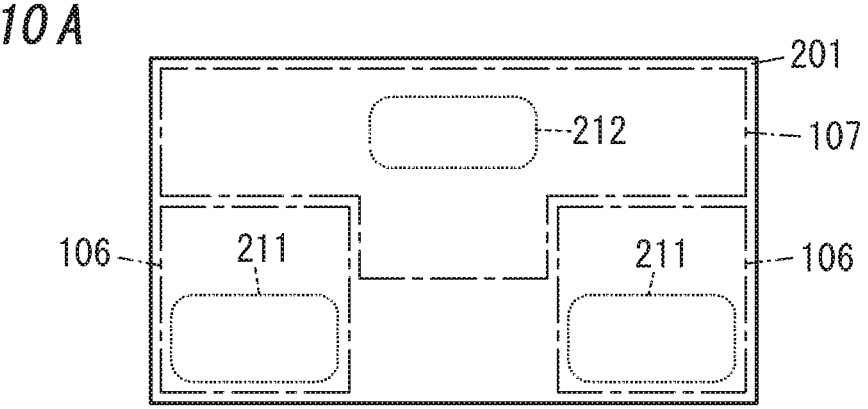
FIG. 10A illustrates a display range of the display unit included in a video display system according to a third variation of the exemplary embodiment of the present disclosure.
Figure 10B:
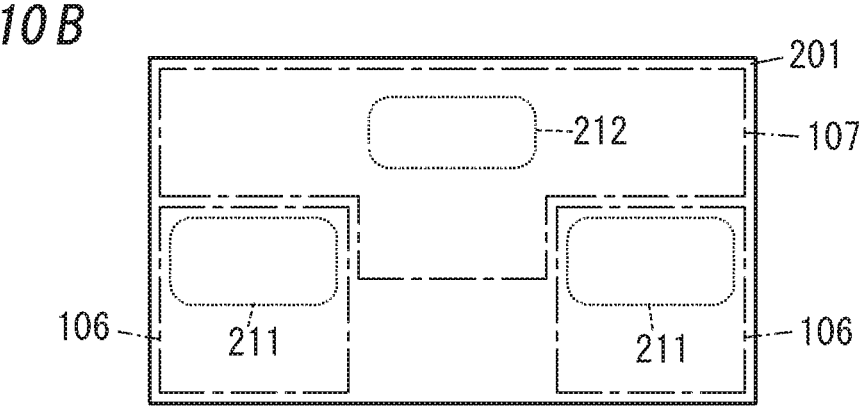
FIG. 10B illustrates another display range of the display unit included in the video display system according to the third variation of the exemplary embodiment of the present disclosure.

As described above, the virtual image 301 includes a first virtual image 301a and a second virtual image 301b to be displayed only when an event occurs. The display control unit 4 changes at least one of the projection distance L1 or the angle of depression $\theta 1$ such that when the projection distance L1 is changed, the first virtual image 301a and the second virtual image 301b are displayed in the displayable region 402. In this variation, the display screen 201 of the display unit 2 is divided into a first display range 106 where an image 211 to constitute the first virtual image 301a is displayed and a second display range 107 where an image 212 to constitute the second virtual image 301b is displayed, as shown in FIGS. 10A and 10B. This reduces the chances of allowing, even when the display control unit 4 has shifted the display location of the image 211 in order to change the angle of depression $\theta 1$ of the first virtual image 301a, the image 211 to constitute the first virtual image 301a to be displayed within the second display range 107.

Figure 11A:
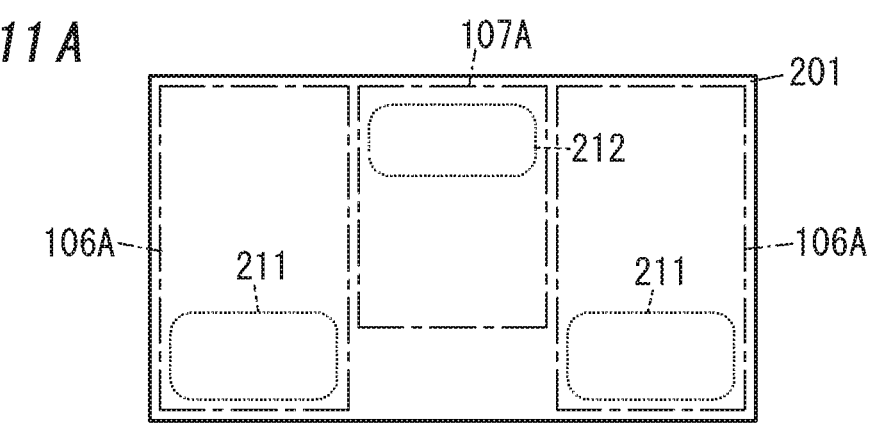
FIG. 11A illustrates still another display range of the display unit included in the video display system according to the third variation of the exemplary embodiment of the present disclosure.
Figure 11B:
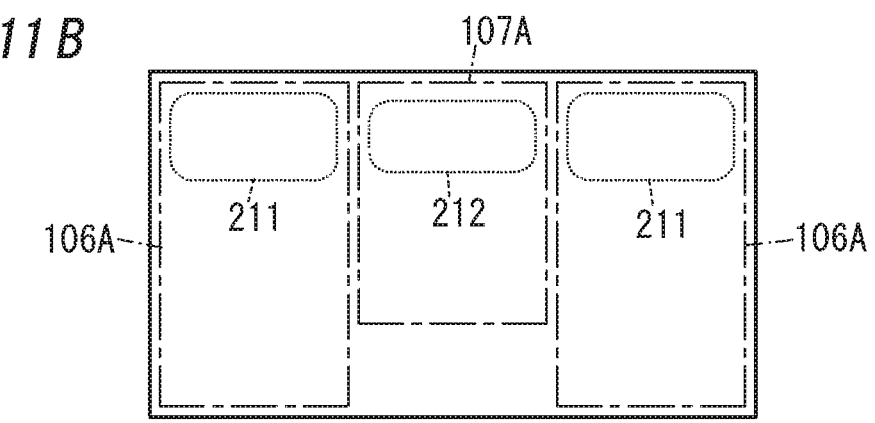
FIG. 11B illustrates yet another display range of the display unit included in the video display system according to the third variation of the exemplary embodiment of the present disclosure.

According to this variation, in the example illustrated in FIGS. 10A and 10B, the second display range 107 is defined by removing a part of the first display range 106. Alternatively, the display screen 201 may be divided in the rightward/leftward direction into three areas, the middle one of which defines a second display range 107A and the right and left ones of which define first display ranges 106A as shown in FIGS. 11A and 11B.

Note that on the display screen 201 of the display unit 2, the arrangement of the first display range 106, 106A and the second display range 107, 107A may be changed appropriately unless these two ranges overlap with each other.

In the embodiment described above, the display control unit 4 varies the projection distance of the first virtual image 301a according to the velocity of the moving vehicle 100 such that the higher the velocity of the moving vehicle 100 is, the more distant the first virtual image 301a is projected (i.e., the longer the projection distance L1 is). In this case, as the moving vehicle 100 sways, the projection position of the first virtual image 301a with respect to the target space 400 varies. Thus, the first virtual image 301a looks, to the user's 200 eyes, swaying with respect to the real space. In addition, the longer the projection distance of the first virtual image 301a is, the more significantly the projection position of the first virtual image 301a varies with the swaying motion of the moving vehicle 100, thus possibly making the variation in the projection position of the first virtual image 301a easily noticeable.

Thus, to reduce the variation in the projection position of the first virtual image 301a due to the sway of the moving vehicle 100, the display control unit 4 may perform correction processing of correcting the sway of the first virtual image 301a. For example, the display control unit 4 may perform correction processing of changing the display location of the image 211 on the display screen of the display unit 2 so as to reduce the variation in the projection position of the first virtual image 301a in accordance with sway information (such as information about the pitch angle, roll angle, and yaw angle) acquired by the moving vehicle information acquisition unit 8. For example, when the moving vehicle body 101 of the moving vehicle 100 is swaying up and down, the display control unit 4 may change the display location of the image 211 on the display screen of the display unit 2 so as to cancel the sway of the moving vehicle 100. When the first virtual image 301a is projected at a distant position, an image 211 to constitute the first virtual image 301a is displayed in an upper part of the first display range 106A on the display screen 201 of the display unit 2 as shown in FIG. 11B. Thus, the display control unit 4 is allowed to perform the sway correction by shifting the image 211 up and down using a lower part of the first display range 106A as well.

That is to say, the display control unit 4 performs the sway correction when the display location of the image 211 to constitute the first virtual image 301a is shifted, within the first display range 106A, from a first location associated with a relatively short projection distance to a second location associated with a relatively long projection distance. According to this variation, in the example illustrated in FIGS. 11A and 11B, the first location is in the lower part of the first display range 106A, and the second location is in the upper part of the first display range 106A. In this case, when the image 211 to constitute the first virtual image 301a is displayed at the second location, the image 211 to constitute the first virtual image 301a is not displayed in the other area, located under the second location, of the first display range 106A, i.e., the area located closer to the first location. Thus, the display control unit 4 performs, using this area, located closer to the first location than to the second location, of the first display range 106A, sway correction of shifting the display location of the image 211 to constitute the first virtual image 301a in order to reduce the sway of the first virtual image 301a in a variable area including that area. Note that the display control unit 4 may determine, according to a dimension (i.e., the vertical dimension in FIGS. 11A and 11B) of the area left under the second location in the first display range 106A, the maximum magnitude of shift, by which the display location of the image 211 is shifted by the sway correction.

As can be seen, the display control unit 4 performs the sway correction of correcting the display location of the image 211 in accordance with the sway information of the moving vehicle 100, thus reducing the variation in the projection position of the first virtual image 301a with respect to the target space 400.

Optionally, the display control unit 4 may change, according to the projection distance of the first virtual image 301a, the type of the correction processing of correcting the sway of the first virtual image 301a with respect to the target space 400.

For example, the display control unit 4 may change the type of the correction processing according to the projection distance so as to perform no correction processing when finding the projection distance of the first virtual image 301a shorter than the predetermined distance and to perform the correction processing when finding the projection distance of the first virtual image 301a equal to or longer than the predetermined distance. As used herein, the "predetermined distance" refers to the maximum value of the distance at which the first virtual image 301a appears, when viewed from the user 200, to overlap with the moving vehicle body 101 (such as the hood) of the moving vehicle 100. For example, the "predetermined distance" may be a distance of up to 4 meters from the front end of the moving vehicle body 101 (such as the hood) of the moving vehicle 100. The "predetermined distance" varies according to the structure of the moving vehicle body 101, the height level of the user's 200 viewpoint P1 (eye box), or any other parameter, for example.

When finding the projection distance of the first virtual image 301a equal to or longer than the predetermined distance, the display control unit 4 determines that the sway correction should to be performed because the sway of the first virtual image 301a with respect to the target space 400 is relatively significant, and does perform the correction processing of correcting the sway of the first virtual image 301a. On the other hand, when finding the projection distance of the first virtual image 301a shorter than the predetermined distance, the display control unit 4 determines that no sway correction should be performed because the sway of the first virtual image 301a with respect to the target space 400 is relatively insignificant, and does not perform the correction processing of correcting the sway of the first virtual image 301a. Making the display control unit 4 perform the correction processing when the effect achieved by correcting the sway of the first virtual image 301a is relatively significant and perform no correction processing when the effect achieved by correcting the sway of the first virtual image 301a is relatively insignificant allows the computational load on the display control unit 4 to be lightened.

In the embodiment described above, the display control unit 4 determines, according to the projection distance of the first virtual image 301a, whether or not to perform the correction processing of correcting the sway of the first virtual image 301a. However, this is only an example and should not be construed as limiting. Alternatively, the display control unit 4 may also change, according to the projection distance, the strength of the correction processing (i.e., the magnitude of correction to reduce the sway).

Also, in the embodiment described above, the display control unit 4 performs the correction processing by changing the display location of the image 211 on the display screen of the display unit 2 in accordance with the sway information. However, this is only an example and should not be construed as limiting. Alternatively, the display control unit 4 may also perform the correction processing by shifting the display unit 2 using an actuator such as a voice coil motor.

Optionally, the display control unit 4 may also perform, in accordance with the sway information acquired by the moving vehicle information acquisition unit 8, the correction processing of changing the display location of the image 212 to constitute the second virtual image 301b. This reduces the chances of the second virtual image 301b looking varying with respect to the target space 400.

(3.4) Other Variations

In the exemplary embodiment described above, the display unit 2 is implemented as a display device such as a liquid crystal display (LCD). However, this is only an example and should not be construed as limiting. Alternatively, the display unit 2 may also be implemented as a different type of display device such as an organic electroluminescent (OEL) display device, instead of an LCD. In addition, the display unit 2 does not have to be a display device such as an LCD, but may also include a projector for projecting light onto a screen. In that case, the projector may be implemented as either a rear projector for displaying an image on the surface of a screen by projecting light from behind the screen or a front projector for displaying an image on the surface of a screen by projecting light from the front of the screen. Alternatively, the projector may also be a scanning projector for producing an image on a screen by scanning the object with light (such as a laser beam) emitted from behind or the front of the screen.

Furthermore, in the embodiment described above, if the driving unit 5 has the function of adjusting the orientation of the second mirror 32 of the projection unit 3, then the display control unit 4 may control the driving unit 5 in accordance with an angle of depression adjustment instruction and have the driving unit 5 change the orientation of the second mirror 32 to adjust the angle of depression θ1. The driving unit 5 may also have the function of adjusting the orientation of at least one of the optical members that form the projection unit 3, the display unit 2, or the body 1. In that case, the angle of depression θ1 may be adjusted by having the display control unit 4 control the driving unit 5 in accordance with the angle of depression adjustment instruction and by having the driving unit 5 adjust the orientation of at least one of the optical members that form the projection unit 3, the display unit 2, or the body 1.

Furthermore, the driving unit 5 may also adjust the angle of depression θ1 by adjusting the orientation of at least one of the optical members that form the projection unit 3, the display unit 2, or the body 1 and by changing the display location of video, corresponding to the virtual image 301, on the display screen of the display unit 2.

Also, in the exemplary embodiment described above, the projection unit 3 includes two mirrors (namely, the first mirror 31 and the second mirror 32) as optical members for making the outgoing light of the display unit 2 incident on the user's 200 eyes. However, this is only an example and should not be construed as limiting. The projection unit 3 does not have to include the mirrors as optical members. Alternatively, the projection unit 3 may include at least one of a mirror or a lens as at least one optical member. That is to say, the number of the optical member that is at least one of a mirror or a lens may be either single or plural.

Furthermore, in the exemplary embodiment described above, the driving unit 5 shifts the display unit 2 in accordance with a control instruction from the display control unit 4 to change the projection distance L1 of the virtual image 301. However, the display unit 2 does not have to be shifted to change the projection distance L1 of the virtual image 301. Alternatively, the projection distance L1 of the virtual image 301 may also be changed by having the driving unit 5 shift at least one of the first mirror 31 or the second mirror 32 of the projection unit 3 in accordance with a control instruction from the display control unit 4. Still alternatively, if the projection unit 3 includes a lens as an optical member, the projection distance L1 of the virtual image 301 may be changed by making the driving unit 5 shift the lens in accordance with a control instruction from the display control unit 4. Yet alternatively, if the projection unit 3 includes a lens such as a liquid crystal lens as an optical member, the projection distance L1 of the virtual image 301 may be changed by making the driving unit 5 adjust the focal length of the liquid crystal lens with the voltage applied to the liquid crystal lens varied.

Furthermore, in the exemplary embodiment described above, the environmental information acquisition unit 6 acquires environmental information about the surrounding environment (such as brightness information) from the sensor provided for the body 1. However, this is only an example and should not be construed as limiting. Alternatively, the environmental information acquisition unit 6 may also acquire the environmental information from a sensor provided for the moving vehicle 100 over the controller area network 111. In that case, the environmental information acquisition unit 6 may acquire the environmental information from the sensor provided for the moving vehicle 100 either directly or via the ECU 110, for example.

Furthermore, in the embodiment described above, the video display system 10 is implemented as a head-up display. However, this is only an example and should not be construed as limiting. Alternatively, the video display system 10 may also be implemented as a head mounted display (HMD) designed to be worn by the user 200 over his or her head.

Furthermore, in the foregoing description of embodiments, if one of two values being compared with each other (such as the change rates of the projection distance L1) is "greater than" the other, the phrase "greater than" may also be a synonym of the phrase "equal to or greater than" that covers both a situation where these two values are equal to each other and a situation where one of the two values is greater than the other. That is to say, it is arbitrarily changeable, depending on selection of a reference value or any preset value, whether or not the phrase "greater than" covers the situation where the two values are equal to each other. Therefore, from a technical point of view, there is no difference between the phrase "greater than" and the phrase "equal to or greater than." Similarly, the phrase "equal to or less than" may be a synonym of the phrase "less than" as well, in the embodiment described above.

(Resume)

As can be seen from the foregoing description, a video display system (10) according to a first aspect includes a display unit (2), a projection unit (3), and a display control unit (4). The display unit (2) displays an image thereon. The projection unit (3) projects a virtual image (301), corresponding to the image, onto a target space (400) with outgoing light of the display unit (2). The display control unit (4) is able to shift a projection position of the virtual image (301) by changing at least one of a projection distance (L1) or an angle of depression (θ1). The projection distance (L1) is a distance from a viewpoint (P1) of a user (200), who is viewing the virtual image (301), to the virtual image (301) projected onto the target space (400). The angle of depression (θ1) is an angle from which the virtual image (301) is viewed from the user's (200) viewpoint (P1). The display control unit (4) changes the projection distance (L1) of the virtual image (301) in accordance with a distance instruction and changes at least one of the projection distance (L1) or the angle of depression (θ1) such that the virtual image (301) is projected onto a displayable region (402). The displayable region (402) is a region, excluding a restricted region (401), of the target space (400).

This aspect reduces the chances of the virtual image (301) projected looking as if part or all of the virtual image (301) penetrated into an object present in the target space (400).

In a video display system (10) according to a second aspect, which may be implemented in conjunction with the first aspect, the display unit (2), the projection unit (3), and the display control unit (4) are all mounted in a moving vehicle (100), and the distance instruction is based on moving vehicle information about the moving vehicle (100).

This aspect allows the projection distance (L1) of the virtual image (301) to be changed in accordance with the moving vehicle information.

In a video display system (10) according to a third aspect, which may be implemented in conjunction with the first or second aspect, the display unit (2), the projection unit (3), and the display control unit (4) are all mounted in a moving vehicle (100), and the display control unit (4) determines the projection position of the virtual image (301) based on at least one of a sway angle of the moving vehicle (100) or the angle of depression (θ1).

This aspect reduces the chances of the virtual image (301) projected looking as if part or all of the virtual image (301) penetrated into an object present in the target space (400).

In a video display system (10) according to a fourth aspect, which may be implemented in conjunction with any one of the first to third aspects, the display control unit (4) changes the projection position of the virtual image (301) such that as the projection distance (L1) is extended, the angle of depression (θ1) decreases.

This aspect reduces the chances of the virtual image (301) projected looking as if part or all of the virtual image (301) penetrated into an object present in the target space (400).

In a video display system (10) according to a fifth aspect, which may be implemented in conjunction with the fourth aspect, the display control unit (4) changes the projection position of the virtual image (301) such that as the projection distance (L1) is changed, the position of the virtual image (301) in a height direction shifts nonlinearly.

This aspect reduces the chances of the virtual image (301) projected looking as if part or all of the virtual image (301) penetrated into an object present in the target space (400).

In a video display system (10) according to a sixth aspect, which may be implemented in conjunction with any one of the first to fifth aspects, the display control unit (4) varies the angle of depression (θ1) in accordance with environmental information about a surrounding environment.

This aspect reduces, by varying the angle of depression (θ1) in accordance with the environmental information, the chances of the virtual image (301) projected looking as if part or all of the virtual image (301) penetrated into an object present in the target space (400).

A video display system (10) according to a seventh aspect, which may be implemented in conjunction with any one of the first to sixth aspects, further includes a receiving unit (7) to receive setting information about the angle of depression (θ1). The display control unit (4) controls the angle of depression (θ1) in accordance with the setting information.

This aspect allows the angle of depression (θ1) of the virtual image (301) to be set in accordance with the setting information received by the receiving unit (7).

A video display system (10) according to an eighth aspect, which may be implemented in conjunction with any one of the first to seventh aspects, further includes a receiving unit (7) to receive setting information about the angle of depression (θ1) corresponding to a given projection distance (L1). The display control unit (4) obtains by interpolation, in accordance with the setting information, the angle of depression (θ1) corresponding to a projection distance (L1) other than the given projection distance (L1).

This aspect allows the angle of depression (θ1) of the virtual image (301) to be set in accordance with the setting information received by the receiving unit (7).

In a video display system (10) according to a ninth aspect, which may be implemented in conjunction with any one of the first to eighth aspects, the virtual image (301) includes a first virtual image (301a) and a second virtual image (301b) that is displayed only when a particular event occurs. A display screen (201) of the display unit (2) includes a first display range (106, 106A) where an image (211) to constitute the first virtual image (301a) is displayed and a second display range (107, 107A) where an image (212) to constitute the second virtual image (301b) is displayed.

This aspect reduces the chances of the first virtual image (301a) and the second virtual image (301b) displayed overlapping with each other.

In a video display system (10) according to a tenth aspect, which may be implemented in conjunction with the ninth aspect, when a display location of the image (211) to constitute the first virtual image (301a) has been shifted, in the first display range (106, 106A), from a first location associated with a relatively short projection distance to a second location associated with a relatively long projection distance, the display control unit (4) performs sway correction. The sway correction is processing of shifting the display location of the image (211) to constitute the first virtual image (301a) so as to reduce sway of the first virtual image (301a) in a variable area including an area located, in the first display range (106, 106A), closer to the first location than to the second location.

This aspect allows, when the projection distance has been extended to shift the display location of the image (211) to constitute the first virtual image (301a) from the first location to the second location, the display control unit (4) to correct the sway using the variable area including an area located closer to the first location than to the second location.

A moving vehicle (100) according to an eleventh aspect includes: the video display system (10) according to any one of the first to tenth aspects; and a moving vehicle body (101) in which the video display system (10) is installed.

This aspect reduces the chances of the virtual image (301) projected looking as if part or all of the virtual image (301) penetrated into an object present in the target space (400).

A video display method according to a twelfth aspect includes: projecting a virtual image (301) onto a target space (400) with outgoing light of a display unit (2); changing a projection distance (L1) of the virtual image (301) in accordance with a distance instruction; and changing at least one of the projection distance (L1) or an angle of depression (θ) such that a virtual image (301) is projected onto a displayable region (402). The projection distance (L1) is a distance from a viewpoint (P1) of a user (200), who is viewing the virtual image (301), to the virtual image (301). The angle of depression (θ) is an angle, from which the virtual image (301) is viewed from the user's (200) viewpoint (P1). The displayable region (402) is a region, excluding a restricted region (401), of the target space (400).

This aspect reduces the chances of the virtual image (301) projected looking as if part or all of the virtual image (301) penetrated into an object present in the target space (400).

A non-transitory storage medium according to a thirteenth aspect stores a program that is designed to make a computer system execute the video display method according to the twelfth aspect.

This aspect reduces the chances of the virtual image (301) projected looking as if part or all of the virtual image (301) penetrated into an object present in the target space (400).

Note that these aspects are only exemplary aspects of the present disclosure. Optionally, various configurations of the video display system (10) according to the exemplary embodiment and its variations described above are also implementable as, for example, a video display method, a (computer) program, or a non-transitory storage medium that stores the program thereon.

Note that the constituent elements according to the second to tenth aspects are not essential elements of the video display system (10) but may be omitted as appropriate.

While various embodiments have been described herein above, it is to be appreciated that various changes in form and detail may be made without departing from the spirit and scope of the present disclosure presently or hereafter claimed.

The entire contents of Japanese Patent Application No. 2018-117663 mentioned above are incorporated by reference for all purposes.

The invention claimed is:

1. A video display system comprising
a display configured to display an image thereon;
a projector configured to project a virtual image, corresponding to the image, onto a target space with outgoing light of the display, the target space comprising a restricted region and a displayable region below the restricted region; and
a display controller configured to be able to shift a projection position of the virtual image by changing at least one of a projection distance or an angle of depression, the projection distance being a distance from a viewpoint of a user, who is viewing the virtual image, to the virtual image projected onto the target space, the angle of depression being an angle from which the virtual image is viewed from the user's viewpoint,
wherein the display controller is configured to change the projection distance of the virtual image in accordance with a distance instruction and to change at least one of the projection distance or the angle of depression such that the virtual image is projected onto the displayable region, excluding the restricted region,
wherein the display controller is further configured to adjust the displayable region within a range that is equal to or higher than a lowest display level of the virtual image, as measured from a road surface,
wherein the virtual image includes a first virtual image and a second virtual image,
wherein the second virtual image is displayed only when a particular event occurs,
wherein a display screen of the display includes a first display range where an image to constitute the first virtual image is displayed and a second display range where an image to constitute the second virtual image is displayed, and
wherein the display controller is configured to, when a display location of the image to constitute the first virtual image has been shifted, in the first display range, from a first location associated with a relatively short projection distance to a second location associated with a relatively long projection distance, perform sway correction to shift the display location of the image to constitute the first virtual image so as to reduce sway of the first virtual image in a variable area including an area located, in the first display range, closer to the first location than to the second location.

2. The video display system of claim 1, wherein
the display, the projector, and the display controller are all mounted in a moving vehicle, and
the distance instruction is based on moving vehicle information about the moving vehicle.

3. The video display system of claim 1, wherein
the display, the projector, and the display controller are all mounted in a moving vehicle, and
the display controller is configured to determine the projection position of the virtual image based on at least one of a sway angle of the moving vehicle or the angle of depression.

4. The video display system of claim 2, wherein
the display, the projector, and the display controller are all mounted in a moving vehicle, and
the display controller is configured to determine the projection position of the virtual image based on at least one of a sway angle of the moving vehicle or the angle of depression.

5. The video display system of claim 1, wherein
the display controller is configured to change the projection position of the virtual image such that as the projection distance is extended, the angle of depression decreases.

6. The video display system of claim 2, wherein
the display controller is configured to change the projection position of the virtual image such that as the projection distance is extended, the angle of depression decreases.

7. The video display system of claim 3, wherein
the display controller is configured to change the projection position of the virtual image such that as the projection distance is extended, the angle of depression decreases.

8. The video display system of claim 4, wherein
the display controller is configured to change the projection position of the virtual image such that as the projection distance is extended, the angle of depression decreases.

9. The video display system of claim 5, wherein
the display controller is configured to change the projection position of the virtual image such that as the projection distance is changed, a position of the virtual image in a height direction shifts nonlinearly.

10. The video display system of claim 6, wherein
the display controller is configured to change the projection position of the virtual image such that as the projection distance is changed, a position of the virtual image in a height direction shifts nonlinearly.

11. The video display system of claim 7, wherein
the display controller is configured to change the projection position of the virtual image such that as the projection distance is changed, a position of the virtual image in a height direction shifts nonlinearly.

12. The video display system of claim 8, wherein
the display controller is configured to change the projection position of the virtual image such that as the projection distance is changed, a position of the virtual image in a height direction shifts nonlinearly.

13. The video display system of claim 1, wherein
the display controller is configured to vary the angle of depression in accordance with environmental information about a surrounding environment.

14. The video display system of claim 1, further comprising a receiver configured to receive setting information about the angle of depression, wherein
the display controller is configured to control the angle of depression in accordance with the setting information.

15. The video display system of claim 1, further comprising a receiver configured to receive setting information about the angle of depression corresponding to a given projection distance, wherein
the display controller is configured to obtain by interpolation, in accordance with the setting information, the angle of depression corresponding to a projection distance other than the given projection distance.

16. A moving vehicle comprising:
the video display system of claim 1; and
a moving vehicle body in which the video display system is installed.

17. A video display method comprising:
projecting a virtual image onto a target space with outgoing light of a display, the target space including a restricted region and a displayable region below the restricted region;
changing a projection distance of the virtual image in accordance with a distance instruction, the projection distance being a distance from a viewpoint of a user, who is viewing the virtual image, to the virtual image;
changing at least one of the projection distance or an angle of depression such that the virtual image is projected onto the displayable region, excluding the restricted region, the angle of depression being an angle from which the virtual image is viewed from the user's viewpoint;
adjusting the displayable region within a range that is equal to or higher than a lowest display level of the virtual image, as measured from a road surface,
wherein the virtual image includes a first virtual image and a second virtual image,
wherein the second virtual image is displayed only when a particular event occurs,
wherein a display screen of the display includes a first display range where an image to constitute the first virtual image is displayed and a second display range where an image to constitute the second virtual image is displayed, and
wherein when a display location of the image to constitute the first virtual image has been shifted, in the first display range, from a first location associated with a relatively short projection distance to a second location associated with a relatively long projection distance, performing sway correction to shift the display location of the image to constitute the first virtual image so as to reduce sway of the first virtual image in a variable area including an area located, in the first display range, closer to the first location than to the second location.

18. A non-transitory storage medium storing a program that is designed to make a computer system execute the video display method of claim 17.

19. A video display system comprising
a display configured to display an image;
a projector configured to project a virtual image, corresponding to the image, onto a target space with outgoing light of the display; and
a display controller configured to shift a projection position of the virtual image by changing at least one of a projection distance or an angle of depression, the projection distance being a distance from a viewpoint of a user, who is viewing the virtual image, to the virtual image projected onto the target space, the angle of depression being an angle from which the virtual image is viewed from the user's viewpoint,
wherein the display controller is configured to change the projection distance of the virtual image in accordance with a distance instruction and to change at least one of the projection distance or the angle of depression such that the virtual image is projected onto a displayable region, excluding a restricted region, of the target space,
wherein the display, the projector, and the display controller are all mounted in a moving vehicle,
wherein the display controller is configured to determine the projection position of the virtual image based on a sway angle of the moving vehicle,
wherein the virtual image includes a first virtual image and a second virtual image,
wherein the second virtual image is displayed only when a user notification event occurs, and
wherein the display controller is configured to perform sway correction to shift the projection position of the first virtual image so as to reduce sway of the first virtual image, the strength of the sway correction being changed in accordance with the projection distance of the virtual image.

* * * * *